(12) United States Patent
Ge et al.

(10) Patent No.: US 12,231,515 B2
(45) Date of Patent: Feb. 18, 2025

(54) SERVICE CONTINUITY EVENT NOTIFICATION METHOD, AND APPARATUS

(71) Applicant: HUAWEI TECHNOLOGIES CO., LTD., Shenzhen (CN)

(72) Inventors: Cuili Ge, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/158,132

(22) Filed: Jan. 23, 2023

(65) Prior Publication Data
US 2023/0164234 A1    May 25, 2023

Related U.S. Application Data

(63) Continuation of application No. PCT/CN2020/104660, filed on Jul. 24, 2020.

(51) Int. Cl.
*H04L 67/55*     (2022.01)
*H04L 67/148*    (2022.01)

(52) U.S. Cl.
CPC ............ *H04L 67/55* (2022.05); *H04L 67/148* (2013.01)

(58) Field of Classification Search
CPC .............................. H04L 67/55; H04L 67/148
See application file for complete search history.

(56) References Cited

U.S. PATENT DOCUMENTS

| 7,310,686 | B2 | 12/2007 | Uysal |
| 8,060,579 | B2 | 11/2011 | Shukla |
| 2006/0075139 | A1 | 4/2006 | Jungck |
| 2018/0310196 | A1* | 10/2018 | Yu ......................... H04L 43/067 |
| 2020/0068451 | A1* | 2/2020 | Mihaly et al. .... H04W 36/0016 |
| 2022/0191650 | A1* | 6/2022 | Kim ........................ H04L 67/10 |
| 2022/0201093 | A1* | 6/2022 | Gupta ..................... H04L 63/10 |
| 2022/0256007 | A1* | 8/2022 | Zhao ....................... H04L 67/60 |
| 2022/0263832 | A1* | 8/2022 | Gupta ................. H04L 63/0838 |
| 2022/0360977 | A1* | 11/2022 | Kim ........................ H04L 65/80 |
| 2022/0394088 | A1* | 12/2022 | Salkintzis ........... H04L 67/1036 |
| 2022/0394580 | A1* | 12/2022 | Minokuchi ......... H04W 36/023 |

(Continued)

FOREIGN PATENT DOCUMENTS

| CN | 1825854 A | 8/2006 |
| CN | 102546538 A | 7/2012 |
| CN | 104967652 A | 10/2015 |

OTHER PUBLICATIONS

Samsung Electronics, "Pseudo-CR Edge Application discovery", 3GPP TSG-SA WG6 Meeting #32 S6-191364, Jul. 12, 2019,total 6 pages.

(Continued)

*Primary Examiner* — Jeong S Park
(74) *Attorney, Agent, or Firm* — HAUPTMAN HAM, LLP

(57) ABSTRACT

A service continuity event notification method and apparatus for providing application layer information for triggering application context relocation. A subscription message is received from a first device, where the subscription message is for requesting to subscribe to a service continuity event notification. A notification message is sent to the first device in response to a condition for the service continuity event notification being satisfied.

8 Claims, 13 Drawing Sheets

(56) References Cited

U.S. PATENT DOCUMENTS

2023/0106757 A1* 4/2023 Tang .................. H04W 40/246 370/252

OTHER PUBLICATIONS

Alibaba Group, "Pseudo-CR on New solution—Service Continuity for Edge Computing Service", 3GPP TSG-SA WG6 Meeting #32 S6-191327,Jul. 12, 2019,total 3 pages.

3GPP TS 23.501 V15.10.0:"3rd Generation Partnership Project; Technical Specification Group Services and System Aspects; System architecture for the 5G System (5GS); Stage 2 (Release 15)",Jul. 2020,total 249 pages.

3GPP TS 23.502 V16.5.0 (Jul. 2020), 3rd Generation Partnership Project;Technical Specification Group Services and System Aspects;Procedures for the 5G System (5GS);Stage 2(Release 16),total 594 pages.

3GPP TS 23.558 V0.3.0:"3rd Generation Partnership Project; Technical Specification Group Services and System Aspects; Architecture for enabling Edge Applications; (Release 17)," Jun. 2020,total 70 pages.

3GPP TSG-SA WG6 Meeting #33,S6-191889, Solution for User plane management event API,Huawei, Hisilicon, Sophia Antipolis, France, Sep. 2-6, 2019,total 5 pages.

International Search Report issued in corresponding International Application No. PCT/CN2020/104660, dated Apr. 2, 2021, pp. 1-12.

Qualcomm Incorporated: "Pseudo-CR on UE -> Edge application context transfer", 3GPP Draft; S6-200679, May 7, 2020, XP051881393, total 6 pages.

Samsung Electronics: "Pseudo-CR Edge Application discovery", 3GPP Draft; S6-191364, Jul. 1, 2019, XP051757924, total 2 pages.

Extended European Search Report issued in corresponding European Application No. 20945949.4, dated Sep. 13, 2023, pp. 1-7.

* cited by examiner

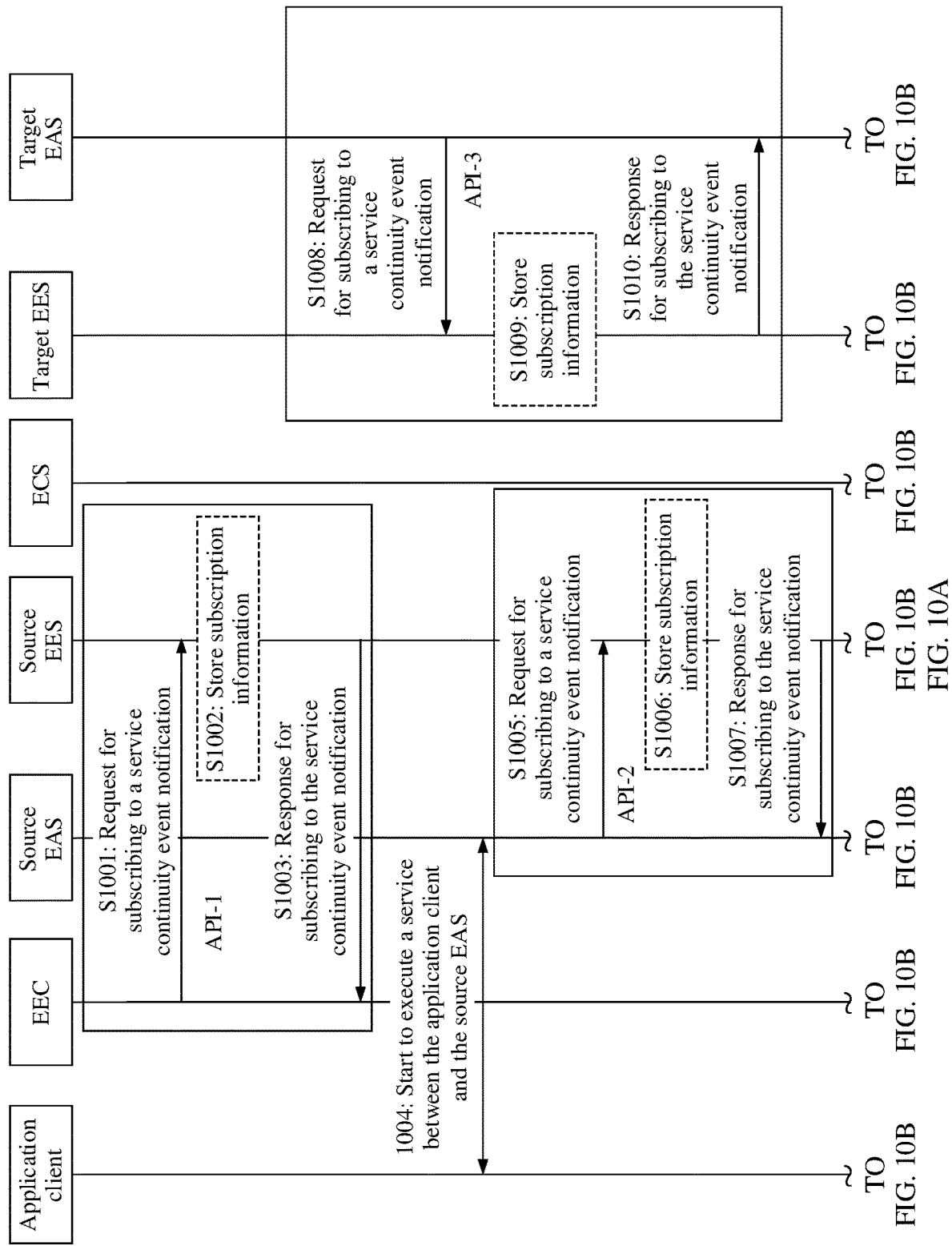

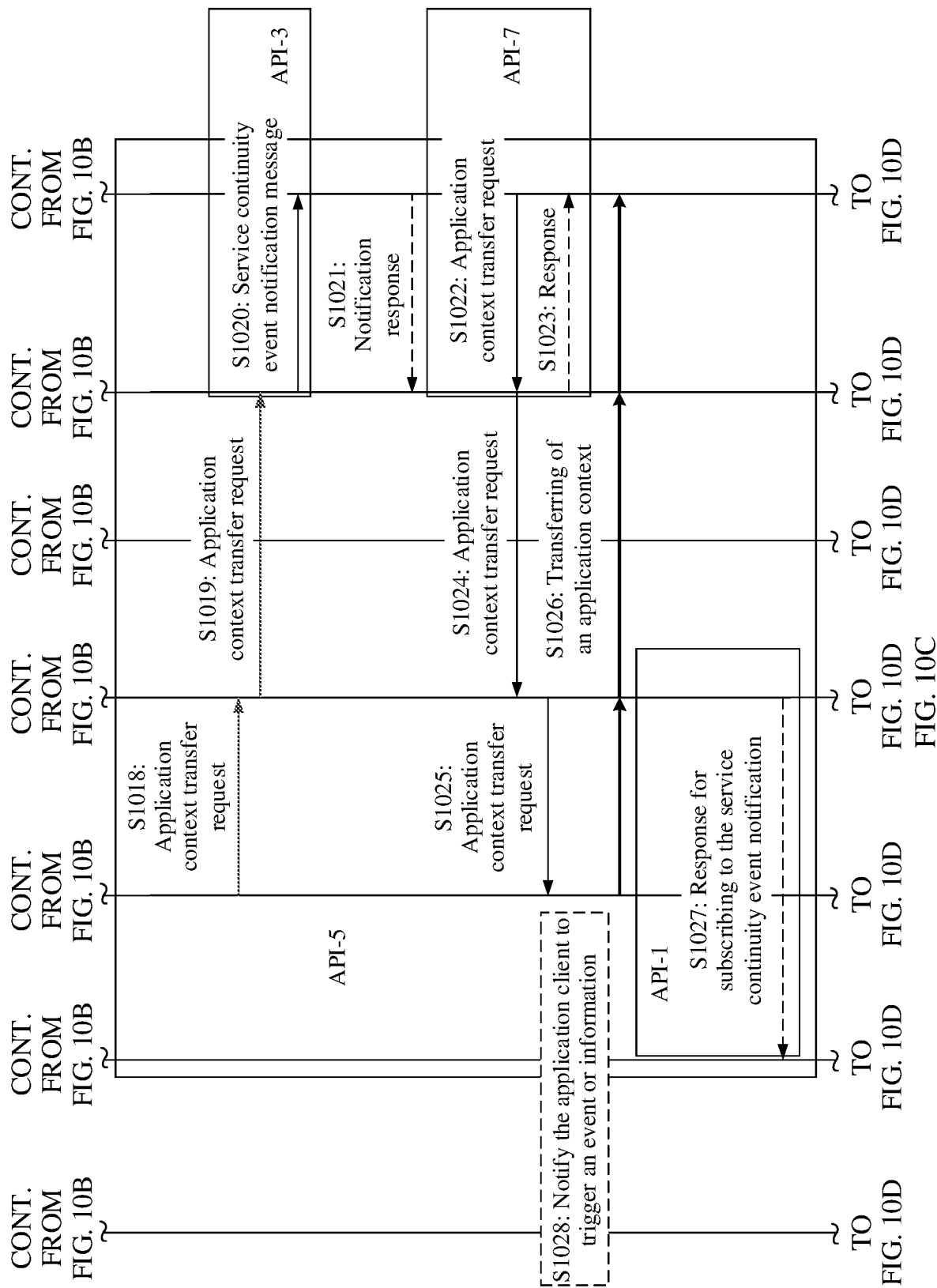

SERVICE CONTINUITY EVENT NOTIFICATION METHOD, AND APPARATUS

CROSS-REFERENCE TO RELATED APPLICATIONS

This application is a continuation of International Application No. PCT/CN2020/104660, filed on Jul. 24, 2020, the disclosure of which is hereby incorporated by reference in its entirety.

TECHNICAL FIELD

This application relates to the field of communication technologies, and in particular, to a service continuity event notification method and an apparatus.

BACKGROUND

As a large quantity of cloud computing resources are deployed on networks, a same application is usually deployed on a plurality of edge data networks. Servers of a same application deployed on different edge data networks can provide a same service and are functionally equivalent. After accessing a network, a terminal device selects an application instance in a nearby edge data network to execute a service. Due to mobility of the terminal device, an application instance previously selected by the terminal device may not continue to provide a service for the terminal device well. To meet a need for service continuity of the application, the network reselects an application instance in a new nearby edge data network for the terminal device to continue the service. This implements switching from a source application instance to a target application instance.

When a data service of the terminal device is switched from the source application instance to the target application instance, a connection of the terminal device is interrupted because the source application instance and the target application instance are in different edge data networks. To maintain service continuity, an application context in the source application instance may be transferred to the target application instance. This process is referred to as application migration or application context relocation.

How to trigger application context relocation is a problem to be resolved.

SUMMARY

This application provides a service continuity event notification method and an apparatus, to provide useful information for an application layer, to help the application layer trigger application context relocation.

According to a first aspect, a service continuity event notification method is provided, and is applicable to an edge enabler server EES. The method includes the following steps: receiving a subscription message from a first device, where the subscription message is for requesting to subscribe to a service continuity event notification; and sending a notification message to the first device when a condition for the service continuity event notification is satisfied. In this way, with the use of notification subscription, the EES may notify the first device of a service continuity event, so that the first device triggers application context relocation based on the notification of the EES.

According to a second aspect, a service continuity event notification method is provided, and is applicable to a first device. The method includes the following steps: sending a subscription message to an edge enabler server EES, where the subscription message is for requesting to subscribe to a service continuity event notification; and receiving a notification message from the EES. In this way, with the use of notification subscription, the first device may receive the service continuity event notification from the EES, so that the first device triggers application context relocation based on the notification of the EES.

According to a third aspect, a communication apparatus is provided. The communication apparatus may be an edge enabler server EES, or may be an apparatus (for example, a chip, a chip system, or a circuit) in the edge enabler server EES, or an apparatus that can be used in pairs with the edge enabler server EES. In a design, the communication apparatus may include modules for performing the method/operations/steps/actions described in the first aspect. The modules may be hardware circuits, may be software, or may be implemented by using a combination of a hardware circuit and software. In a design, the communication apparatus may include a processing module and a communication module. The processing module is configured to invoke the communication module to perform a receiving and/or sending function. The communication module may further include a receiving module and a sending module.

For example, the receiving module is configured to receive a subscription message from a first device, where the subscription message is for requesting to subscribe to a service continuity event notification. The sending module is configured to send a notification message to the first device when a condition for the service continuity event notification is satisfied.

According to a fourth aspect, a communication apparatus is provided. The communication apparatus may be a first device, or may be an apparatus (for example, a chip, a chip system, or a circuit) in the first device, or an apparatus that can be used in pairs with the first device. In a design, the communication apparatus may include modules for performing the method/operations/steps/actions described in the second aspect. The modules may be hardware circuits, may be software, or may be implemented by using a combination of a hardware circuit and software. In a design, the communication apparatus may include a processing module and a communication module. The processing module is configured to invoke the communication module to perform a receiving and/or sending function. The communication module may further include a receiving module and a sending module.

For example, the sending module is configured to send a subscription message to an edge enabler server EES, where the subscription message is for requesting to subscribe to a service continuity event notification. The receiving module is configured to receive a notification message from the EES. In this way, with the use of notification subscription, the first device may receive the service continuity event notification from the EES, so that the first device triggers application context relocation based on the notification of the EES.

With reference to any one of the first aspect, the second aspect, the third aspect, or the fourth aspect, this application provides some possible designs. Details are as follows.

In a possible design, the EES is a source EES, and the first device is an edge enabler client EEC. The EEC subscribes to a service continuity event from the source EES to obtain information for determining triggering of an application context, a target EAS for triggering a connection, or an operation of transferring application data to the target EAS. This can simplify implementation and processing logic of the EEC.

In a possible design, the EES is a source EES, and the first device is a source EAS. The source EAS subscribes to a service continuity event from the source EES to obtain information for determining triggering of an application context, a target EAS for triggering a connection, or an operation of transferring application data to the target EAS. This can simplify implementation and processing logic of the source EAS.

In a possible design, the EES is a target EES, and the first device is a target EAS. The target EAS subscribes to the service continuity event from the target EES, to obtain a pushed context, or an application context for actively requesting the source EAS to pull the terminal device. This can simplify implementation and processing logic of the target EAS.

In a possible design, the notification message includes an event category, and the event category indicates a category of an event that triggers the service continuity event notification.

In a possible design, the EES is a source EES. The event category includes any one or more of the following: inter-edge data network EDN mobility of a terminal device, load, completion of application context transfer, application relocation, or a change in an address of the terminal device.

In a possible design, the EES is a source EES. The event category includes any one or more of the following: inter-edge data network EDN mobility of a terminal device, load, completion of application context transfer, application relocation, or a change in an address of the terminal device.

In a possible design, the EES is a source EES, the first device is a source EAS, and the event category further includes any one or more of the following: service recovery, service interruption, or application context recovery.

In a possible design, the EES is a source EES, the first device is an edge enabler client EEC, and the event category further includes that an address of an edge application server EAS that serves a terminal device corresponding to the EEC changes.

In a possible design, the EES is a target EES, the first device which is also called as a first network element is a target EAS, and the event category includes any one or more of the following: inter-edge data network EDN mobility of the terminal device, service recovery, service interruption, application context transfer, application context relocation, or a change in an address of the terminal device.

In a possible design, the EES is a target EES, the first device is a target EAS, and the event category includes any one or more of the following: information about a source EAS, an identifier of the terminal device, or an address for obtaining an application context.

In a possible design, the subscription message includes a condition for the service continuity event notification, or the condition for the service continuity event notification is set by the EES.

In a possible design, the subscription message includes at least one of the identifier of the terminal device or an identifier of an application.

In addition, with reference to the first aspect, in addition to some possible designs provided above, some possible designs may be further provided. Details are described as follows.

In a possible design, the EES is a source EES. The source EES sends the notification message to the first device when determining any one or more of the following: the terminal device moves outside a source EDN or a service area of a source EAS; if a data network access identifier DNAI of the terminal device changes, the source EES determines, based on a changed DNAI, that the terminal device moves outside the source EDN or the service area of the source EAS; and a message for requesting application context transfer is received from the first device; a message for requesting application context relocation is received from the first device; the source EAS transfers a context to a target EAS; a message for requesting context relocation is received from a target EES; a message for requesting context transfer is received from the target EES; the source EAS is overloaded or the source EDN is determined to be overloaded; or the source EES initiates application context relocation.

In a possible design, the EES is the source EES, the first network element is the EEC. The sending a notification message to the first device when a condition for the service continuity event notification is satisfied includes: The source EES sends the notification message to the first device when determining any one or more of the following: an address of the target EAS is different from that of a source EAS; the source EAS starts to transfer an application context to the target EAS; application context transfer is completed; the source EAS requests to switch a network user plane path of the terminal device; or the source EES requests to switch the network user plane path of the terminal device.

In a possible design, the EES is the source EES, the first network element is the source EAS. The source EES sends a notification message to the first device when determining that the terminal device roams.

In a possible design, that the source EES determines that the terminal device roams may be implemented in the following manner: The EES obtains indication information from an AMF or an SMF, where the indication information indicates that the terminal device roams.

In a possible design, the EES is a target EES, and the first device is a target EAS. The source EES sends the notification message to the first device when receiving any one or more of the following information: an EAS discovery request message from the source EES, a message for requesting application context transfer, a message for requesting application context relocation, or signaling or a data packet including an application context.

In addition, with reference to the third aspect, in addition to some possible designs provided above, some possible designs may be further provided. Details are described as follows.

In a possible design, the apparatus is a source EES. The processing module is specifically configured to send the notification message to the first device by the sending module when determining any one or more of the following: the terminal device moves outside a source EDN or a service area of a source EAS; if a data network access identifier DNAI of the terminal device changes, the processing module determines, based on a changed DNAI, that the terminal device moves outside the source EDN or the service area of the source EAS; and a message for requesting application context transfer is received from the first device; a message for requesting application context relocation is received the first device; the source EAS transfers a context to the target EAS; a message for requesting context relocation is received from a target EES; a message for requesting context transfer is received from the target EES; the source EAS is overloaded or the source EDN is determined to be overloaded; or the source EES initiates application context relocation.

In a possible design, the apparatus is the source EES, the first network element is the EEC. The processing module is specifically configured to send the notification message to the first device by the sending module when determining any one or more of the following: an address of the target EAS is different from that of the source EAS; the source EAS starts to transfer an application context to the target EAS; application context transfer is completed; the source EAS requests to switch a network user plane path of the terminal device, or the source EES requests to switch the network user plane path of the terminal device.

In a possible design, the apparatus is the source EES, the first network element is the source EAS. The source EES sends a notification message to the first device when determining that the terminal device roams.

In a possible design, the processing module is further configured to obtain indication information from an AMF or an SMF, where the indication information indicates that the terminal device roams.

In a possible design, the apparatus is a target EES, and the first device is a target EAS. The processing module is specifically configured to send the notification message to the first device by the sending module when determining any one or more of the following: an EAS discovery request message from the source EES, a message for requesting application context transfer, a message for requesting application context relocation, or signaling or a data packet including an application context.

According to a fifth aspect, a communication apparatus is provided. The communication apparatus includes a communication interface and a processor. The communication interface is used by the communication apparatus to communicate with another device, for example, to send and receive data or signals. For example, the communication interface may be a transceiver, a circuit, a bus, a module, or a communication interface of another type, and the another device may be a network device or another terminal. The processor is configured to invoke a group of programs, instructions, or data to perform the method described in the first aspect. The communication apparatus may further include a memory, configured to store the programs, the instructions, or the data invoked by the processor. The memory is coupled to the processor. When executing the instructions or the data stored in the memory, the processor can implement the method described in the first aspect.

According to a sixth aspect, a communication apparatus is provided. The communication apparatus includes a communication interface and a processor. The communication interface is used by the communication apparatus to communicate with another device, for example, to send and receive data or signals. For example, the communication interface may be a transceiver, a circuit, a bus, a module, or a communication interface of another type, and the another device may be a network device or another terminal. The processor is configured to invoke a group of programs, instructions, or data to perform the method described in the second aspect. The communication apparatus may further include a memory, configured to store the programs, the instructions, or the data invoked by the processor. The memory is coupled to the processor. When executing the instructions or the data stored in the memory, the processor can implement the method described in the second aspect.

According to a seventh aspect, an embodiment of this application further provides a computer-readable storage medium. The computer-readable storage medium stores computer-readable instructions. When the computer-readable instructions are run on a computer, the method according to the first aspect is performed.

According to an eighth aspect, an embodiment of this application further provides a computer-readable storage medium. The computer-readable storage medium stores computer-readable instructions. When the computer-readable instructions are run on a computer, the method according to the second aspect is performed.

According to a ninth aspect, an embodiment of this application provides a chip system. The chip system includes a processor, and may further include a memory, configured to implement the method according to the first aspect. The chip system may include a chip, or may include a chip and another discrete device.

According to a tenth aspect, an embodiment of this application provides a chip system. The chip system includes a processor, and may further include a memory, configured to implement the method according to the second aspect. The chip system may include a chip, or may include a chip and another discrete device.

According to an eleventh aspect, an embodiment of this application provides a communication system. The communication system includes the apparatus described in the third aspect and the apparatus described in the fourth aspect. Alternatively, the communication system includes the apparatus described in the fifth aspect and the apparatus described in the sixth aspect.

According to a twelfth aspect, a computer program product including instructions is provided. When the computer program product runs on a computer, the method according to the first aspect is performed.

According to a thirteenth aspect, a computer program product including instructions is provided. When the computer program product runs on a computer, the method according to the second aspect is performed.

BRIEF DESCRIPTION OF DRAWINGS

FIG. 10A to FIG. 10D are a fourth schematic flowchart of a service continuity event notification method according to an embodiment of this application;

DESCRIPTION OF EMBODIMENTS

Embodiments of this application provide a service continuity event notification method and an apparatus. The method and the apparatus are based on a same invention concept. Because the method and the apparatus have a similar problem-resolving principle, mutual reference may be made to implementation of the apparatus and the method. Repeated parts are not described in detail. The term "and/or" in the descriptions of embodiments of in this application describes an association relationship for describing associated objects and represents that three relationships may exist. For example, A and/or B may represent the following three cases: Only A exists, both A and B exist, and only B exists. The character "/" generally indicates an "or" relationship between the associated objects. In this application, "at least one" means one or more, and "a plurality of" means two or more. In addition, it should be understood that in the descriptions of this application, terms such as "first" and "second" are only for distinction and description, but cannot be understood as indicating or implying relative importance, or as indicating or implying an order.

The service continuity event notification method provided in embodiments of this application is applicable to a 4th generation (4th generation, 4G) communications system, for example, a 5th generation (5th generation, 5G) communications system, or various future communication systems.

The following describes embodiments of this application in detail with reference to the accompanying drawings.

Figure 1:
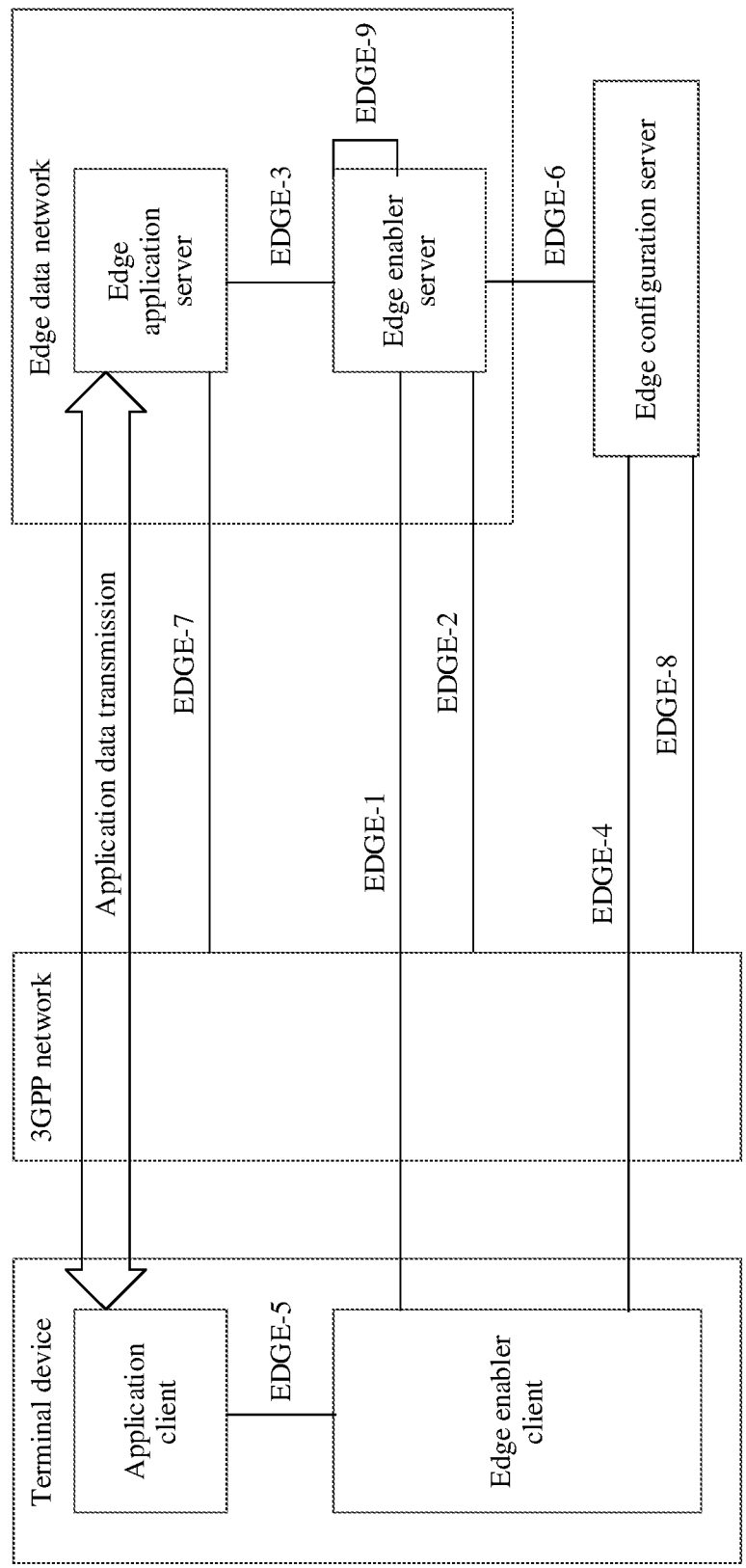
FIG. 1 is a schematic diagram of an architecture of a communication system according to an embodiment of this application.

FIG. 1 is an architecture of a possible communication system to which a service continuity event notification method is applicable according to an embodiment of this application. Referring to FIG. 1, the communication system may include a terminal device, a 3GPP network, and an edge data network (edge data network, EDN). The terminal device may include an application client (application client, AC) and an edge enabler client (edge enabler client, EEC). The EDN may include an edge application server (edge application server, EAS) and an edge enabler server (edge enabler server, EES). The communication system may further include an edge configuration server (edge configuration server, ECS).

There may be one or more devices included in the communication system. There may be one or more EDNs.

The following describes functions of devices or modules in the communication system.

The terminal device is also referred to as user equipment (user equipment, UE), a mobile station (mobile station, MS), a mobile terminal (mobile terminal, MT), or the like. The terminal device is a device that provides users with voice or data connectivity, or may be an Internet-of-Things device. For example, the terminal device is a handheld device, a vehicle-mounted device, or the like that has a wireless connection function. Currently, the terminal device may be a mobile phone (mobile phone), a tablet computer, a notebook computer, a palmtop computer, a mobile internet device (mobile internet device, MID), a wearable device (for example, a smartwatch, a smartband, or a pedometer), a vehicle-mounted device (for example, the vehicle-mounted device on an automobile, a bicycle, an electric vehicle, an aircraft, a ship, a train, or a high-speed train), a virtual reality (virtual reality, VR) device, an augmented reality (augmented reality, AR) device, a wireless terminal in industrial control (industrial control), a smart home device (for example, a refrigerator, a television, an air conditioner, or an electricity meter), an intelligent robot, a workshop device, a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a flight device (for example, an intelligent robot, a hot balloon, an uncrewed aerial vehicle, or an aircraft), or the like. In addition, the terminal device may alternatively be a chip.

EDN: In general understanding, the EDN is a logical network concept and corresponds to only one data network. The EDN is a special local data network (local DN) including edge enabling functions, and can be identified by a DNAI and a DNN. Another understanding of the EDN is that the EDN is a peer-to-peer concept of central cloud, and may be understood as a local data center. "Local" is a geographical location concept. The EDN may be identified by a DNAI, and may include a plurality of local data networks (local DN).

Application client (AC): The application client is a peer entity of an EAS on a terminal device side. The AC is used to obtain application services from an application server by an application user (user). The application client is a client program of an application on the terminal side. The application client may be connected to an application server on a cloud to obtain application services, or may be connected to an EAS deployed and running in one or more EDNs to obtain application services.

EAS: The EAS may also be referred to as an application instance, an edge application, an edge application server, an edge application instance, an MEC application, an MEC application server, an EAS function, or the like, which are collectively referred to as an EAS for description in embodiments of this application. The EAS is specifically a server application program, for example, social media software, augmented reality (augmented reality, AR), or virtual reality (virtual reality, VR) deployed in an instance (instance) of an EDN. EASs may be deployed for an application in one or more EDNs. The EASs deployed in different EDNs may be considered as different EASs of the application. The EASs may share a same domain name, and use a same internet protocol (internet protocol, IP) address or use different IP addresses.

EES: The EES may provide some enablement or support capabilities for application instances deployed in the EDN to better support the deployment of applications in the EDN. The EES may support registration of edge applications, authentication and authorization for UE, provide IP address information of the application instances for the UE, and the like. The EES may further support obtaining an identifier and IP address information of the application instance, and further send the identifier and the IP address information of the application instance to an edge data network configuration server. The EES is deployed in the EDN. Generally, the EAS is registered with an EES, or information about an EAS is configured on the EES through a management system. The EES may be referred to as an EES associated with the EAS. The EES controls (or manages) the EAS registered (or configured) on the EES. An application instance registered on the EES is generally an application instance that has been instantiated but has not started to provide services for clients, an application instance configured on the EES by the management system, an application instance in which an application installation package has been configured on the EES but has not been instantiated, or an application instance that runs on the EES and generally has provided services for the client, or an application instance that has not yet been deployed but can be deployed on the EES.

EEC: The EEC is a peer entity of the EES on the terminal device side. The EEC is configured to register information of the EEC and information about an application client with the EES, perform security authentication and authorization, obtain an IP address of the EAS from the EES, and provide an edge computing enabling capability for the application client. For example, an EAS discovery service returns an address of the EAS, such as the IP address or URL, to the application client.

ECS: The ECS is responsible for configuration of the EDN, for example, providing information about the EES for the terminal device. Alternatively, the ECS may directly provide information about an application instance to the terminal device, and interact with the DNS to obtain the information about the application instance. Further, the ECS may obtain the information about the application instance and information about an IP address from another functional entity and store the information.

An application user signs a service agreement with an application provider, to provide services for the application user. The application user logs in to an application client on a terminal device and communicates with the EAS via the application client. An enabler client (for example, the EEC) is a middleware layer, and is generally located in an operating system, or is located between the application client and the operating system. The application client may obtain an edge enabling service from the enabler client through an application programming interface (application programming interface, API).

It should be noted that, in embodiments of this application, devices or functional modules may communicate with each other through an interface, or may interact with each other through a service-oriented interface. In FIG. 1, names of interfaces between devices or functional modules are examples. However, the name of the interface is merely an example, and may alternatively be replaced with another name. This is not limited in embodiments of this application.

Devices or functional modules included in the communication system may alternatively have other names. Optionally, functional modules in embodiments of this application may be implemented by one device, or may be jointly implemented by a plurality of devices, or may be implemented by one or more functional modules in one device. This is not specifically limited in embodiments of this application. It may be understood that each function in embodiments of this application may be a network element in a hardware device, may be a software function running on dedicated hardware, a combination of hardware and software, or a virtualization function instantiated on a platform (for example, a cloud platform).

It should be noted that a distribution pattern of functional modules or devices is not limited in embodiments of this application. Optionally, each functional module may alternatively include another functional entity formed by combining any one of the foregoing plurality of functional modules.

An application can be deployed on a plurality of edge data networks to provide same services for clients. Due to a mobility characteristic of a terminal device, a server side (namely, an EAS) that provides an application service for an application client on the terminal device may change from an EAS in an edge data network to another EAS of the application in a same edge data network, or to an EAS of the application in another edge data network. This involves relocation (which may also be understood as switching) between the EES and the EAS of the application service of the terminal in different edge data networks. Such a case in which an application server that provides a service for an application on a terminal device changes from one EAS to another EAS may be referred to as application relocation. In this application, application relocation may be further understood as application context relocation during application relocation, or application relocation may be equivalent to application context relocation.

In embodiments of this application, application context relocation may be that an application context corresponding to the application client on the terminal device is transferred from a source EAS to a target EAS. A need for service continuity of the application is met through application context relocation.

In embodiments of this application, an edge data network in which an application of the terminal device is originally located is referred to as a source edge data network, and a new edge data network to which the application of the terminal device switches is referred to as a target edge data network. An EAS running the application in the source edge data network is referred to as a source EAS. An EES associated with the source EAS is referred to as a source EES.

Generally, an application instance runs on a virtual machine in a data center. The source EAS and a source edge enabler server may be deployed in a same physical room, and deployed on a same physical device or different physical devices. Similarly, an EAS that can run the application in the target edge data network is referred to as a target EAS. An EES associated with the target EAS is referred to as a target EES, or the target EAS is an EAS that receives (or accepts) an application that needs to be relocated. The target EAS and a target edge enabler server may be deployed in a same physical room, and deployed on a same physical device or different physical devices.

In embodiments of this application, the EAS provides services for an application user (user) having a service agreement with an application provider. The application user logs in to an application client on a terminal device and communicates with the EAS via the application client. The EEC is generally located in the operating system or between the application client and the operating system. The application client may obtain an edge enabling service from the enabler client through an application programming interface (application programming interface, API). The EAS may obtain the edge enabling service from the enabler server through the API.

When the terminal device moves from the source edge data network to the target edge data network, a source EAS that currently serves an application user is no longer an optimal server that can provide a service for the user, and service quality obtained by the user from the source EAS may be degraded. For example, a user plane path for the user to access the application service is not optimal, resulting in a delay or interruption of the application service. To reduce the delay of the application service and ensure the continuity of the application service, application context relocation needs to be performed. The application context relocation may also be understood as redirection of an EAS or switching of an EAS. Therefore, the application context of the terminal device needs to be relocated from the source EAS to the target EAS. Application context relocation of the terminal device may be implemented with the assistance of the source EES and the target EES. Embodiments of this application describe how to implement application context relocation of the terminal device via the source EES and/or the target EES.

Figure 2:
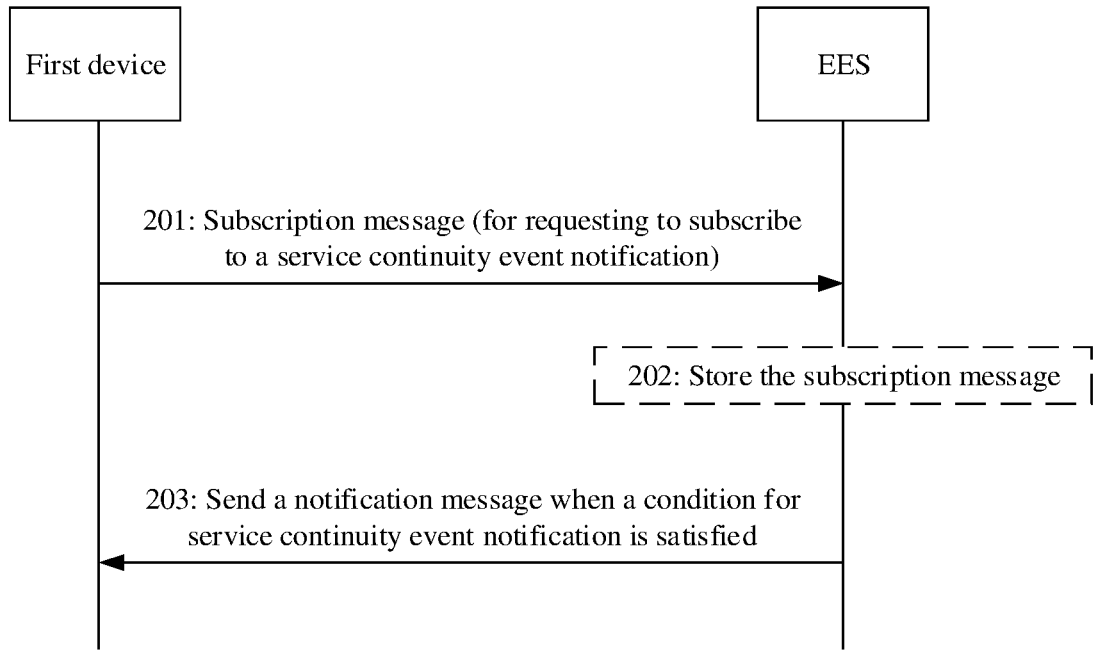
FIG. 2 is a first schematic flowchart of a service continuity event notification method according to an embodiment of this application.

As shown in FIG. 2, a specific procedure of a service continuity event notification method provided in this application is described as follows.

This method can be applied to an EES.

S201: A first device sends a subscription message to the EES, and the EES receives the subscription message from the first device.

The subscription message is for requesting to subscribe to a service continuity event notification. The subscription message may be referred to as a service continuity event subscribe request (service continuity event subscribe request) message or a service continuity subscribe request (service continuity subscribe request).

A service continuity event may alternatively be understood as an application context relocation event or an event related to application context relocation. Therefore, the subscription message may alternatively be understood as a message for requesting to subscribe to an application context relocation event notification.

S202: The EES stores subscription information in the subscription message.

This step is optional. The subscription information may be information or a parameter carried in the subscription message. Specifically, the EES stores an identifier of the first device and the information or the parameter carried in the subscription message.

S203: The EES sends a notification message to the first device when a condition for the service continuity event notification is satisfied, and the first device receives the notification message from the EES.

The notification message may be referred to as a service continuity event subscribe response (service continuity event subscribe response) message or a service continuity subscribe response (service continuity subscribe response) message. The message indicates whether a subscription request of the first device is accepted or rejected. When the EES accepts the subscription request, the subscription response indicates that the subscription is successful. When the EES rejects the subscription request, the subscription response indicates that the subscription is rejected or the subscription fails.

In this way, with the use of notification subscription, the EES may notify the first device of the service continuity event, so that the first device triggers application context relocation based on the notification of the EES.

The following provides supplementary descriptions of optional implementations of the service continuity event notification method in this embodiment of this application.

The first device may obtain the service continuity event from the EES through an API. That is, the EES provides a service API for a service continuity event. Operations of the service API include the subscription in the embodiment in FIG. 2, and may further include at least one operation of subscription update or subscription cancellation. Step S201 may be understood as that the first device invokes the API of the EES.

Optionally, the condition for the service continuity event notification may be set by the EES, or may be obtained from the subscription message. The condition for the service continuity event notification may also be referred to as a filter (filter) of the service continuity event notification, which indicates to receive an expected service continuity event notification that matches the condition or the filter, or may also be understood as an expected service continuity event notification message to be received when an event (or information) indicated by the condition or the filter occurs.

The subscription message may further include an identifier of a terminal device, indicating that the subscription message is for requesting the service continuity event notification for the terminal device. The subscription message may further include an identifier of an application and an identifier of a service, indicating that the subscription message is for requesting the service continuity event notification for the application or the service. The identifier of the application may be an EAS identifier (identity, ID) or an FQDN, or may be an AC ID, or may be a combination of an EAS ID, an FQDN, and an AC ID.

Certainly, the subscription message may include the identifier of the terminal device and the identifier of the application. The subscription message is for requesting the service continuity event notification of the application for the terminal device.

It may be understood that the subscription message may further request to subscribe to the service continuity event notification for another granularity.

When the subscription message includes the condition for the service continuity event notification, the condition for the service continuity event notification may include the identifier of the terminal device and/or the identifier of the application. That is, the identifier of the terminal device and/or the identifier of the application may be included in the subscription message as a part of the condition for the service continuity event notification.

The subscription message may further include an event category. The event category indicates a category of an event that triggers the service continuity event notification. When subscription message includes the condition for the service continuity event notification, the condition for the service continuity event notification may include the event category, which indicates to receive an expected service continuity event notification related to the event category, or may also be understood as an expected service continuity event notification to be received when an event indicated by the event category occurs.

In S203, when the condition for the service continuity event notification is related to one or more event categories, the notification message may also include a related event category.

The event category may also be referred to as a cause value.

The following further describes extension of the scenario of the embodiment in FIG. 2 based on a specific type of the first device and a specific type of the EES.

Figure 3:
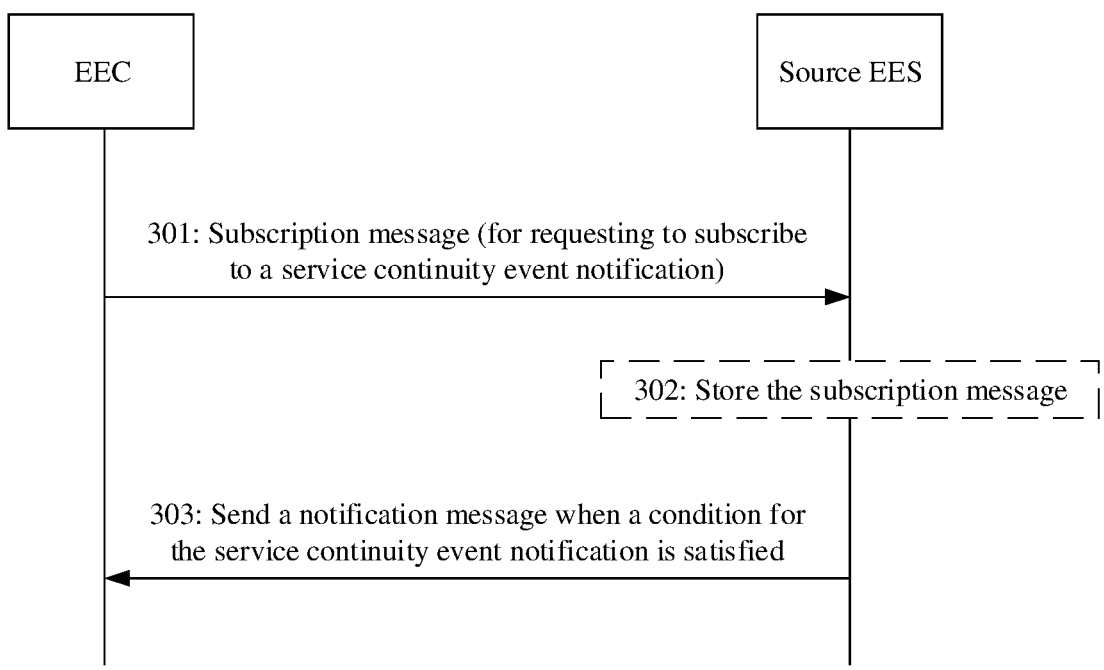
FIG. 3 is a second schematic flowchart of a service continuity event notification method according to an embodiment of this application.

As shown in FIG. 3, the EES is a source EES, and related description of the source EES has been described above.

The first device may be an EEC.

S301: The EEC sends a subscription message to the EES, and the source EES receives the subscription message from the EEC.

The subscription message is for requesting to subscribe to a service continuity event notification. For a specific description of the subscription message, refer to step S201. Details are not described again.

S302: The source EES stores subscription information.

This step is optional. The subscription information may be information or a parameter carried in the subscription message. For a specific description of storing the subscription information by the source EES, refer to step S202. Details are not described again.

S303: The source EES sends a notification message to the EEC when a condition for the service continuity event notification is satisfied, and the EEC receives the notification message from the source EES.

Figure 4:
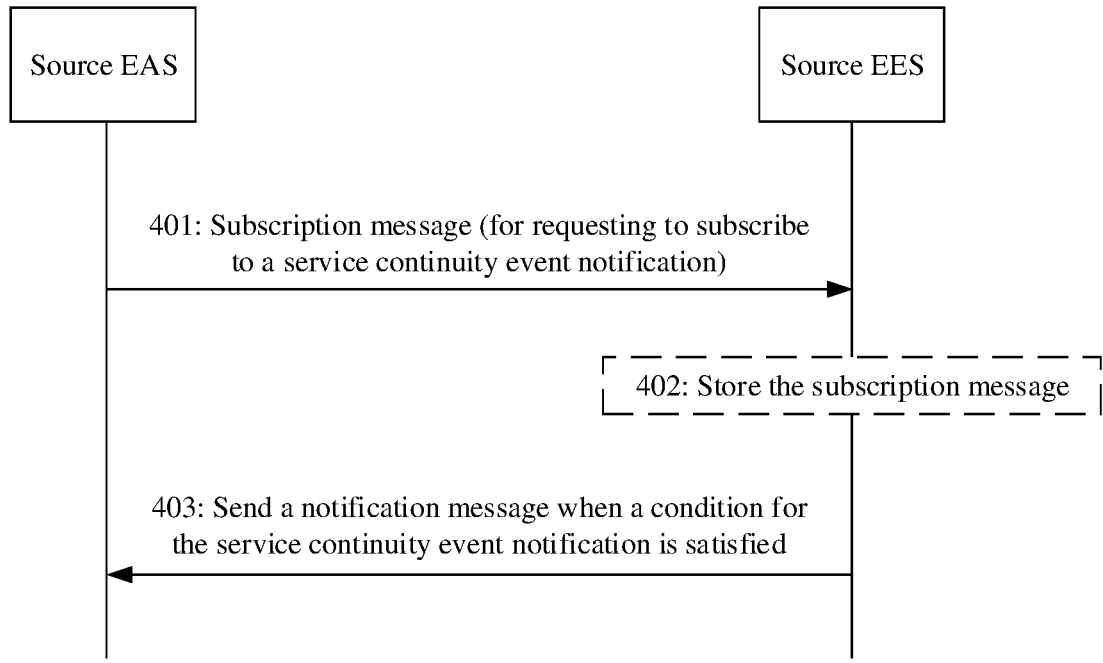
FIG. 4 is a third schematic flowchart of a service continuity event notification method according to an embodiment of this application.

As shown in FIG. 4, the EES is a source EES, and related description of the source EES has been described above.

The first device may be a source EAS. Related descriptions of the source EAS have been described above. Details are not described herein again.

S401: The source EAS sends a subscription message to the source EES, and the source EES receives the subscription message from the source EAS.

The subscription message is for requesting to subscribe to a service continuity event notification. For a specific description of the subscription message, refer to step S201. Details are not described again.

S402: The source EES stores subscription information.

This step is optional. The subscription information may be information or a parameter carried in the subscription message. For a specific description of storing the subscription information by the source EES, refer to step S202. Details are not described again.

S403: The source EES sends a notification message to the source EAS when a condition for the service continuity event notification is satisfied, and the source EAS receives the notification message from the source EES.

Figure 5:
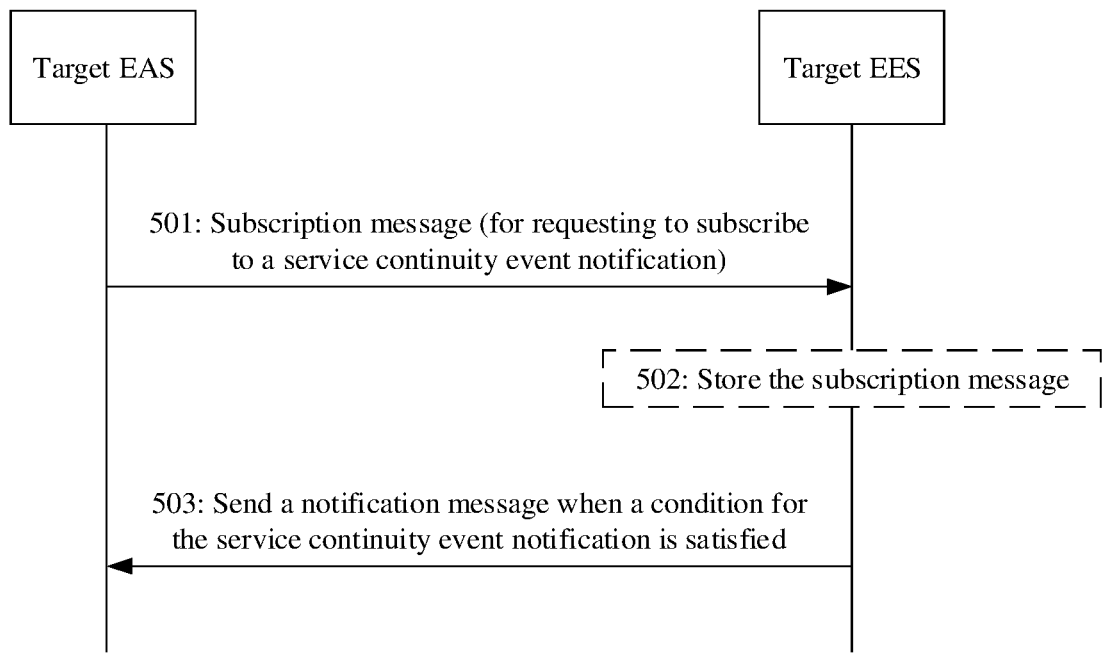
FIG. 5 is a fourth schematic flowchart of a service continuity event notification method according to an embodiment of this application.

As shown in FIG. 5, the EES is a target EES, and related description of the target EES has been described above.

The first device may be a target EAS. Related descriptions of the target EAS have been described above. Details are not described herein again.

S501: The target EAS sends a subscription message to the target EES, and the target EES receives the subscription message from the target EAS.

The subscription message is for requesting to subscribe to a service continuity event notification. For a specific description of the subscription message, refer to step S201. Details are not described again.

S502: The target EES stores subscription information.

This step is optional. The subscription information may be information or a parameter carried in the subscription message. For a specific description of storing the subscription information by the source EES, refer to step S202. Details are not described again.

S503: The target EES sends a notification message to the target EAS when a condition for the service continuity event notification is satisfied, and the target EAS receives the notification message from the target EES.

The following provides supplementary descriptions of optional implementations of the embodiments in FIG. 3 to FIG. 5.

According to the embodiment in FIG. 3, the event category may include any one or more of the following:

mobility of a terminal device, inter-EDN (inter-EDN) mobility of the terminal device, predictive inter-EDN mobility of the terminal device, load, application context transfer, application context relocation, a change in an address of the terminal device, service recovery, service interruption, or application context recovery.

The application context transfer may include one or more of application context push, application context pull, or completion of application context transfer. Application context relocation is also referred to as application relocation. The application context relocation may include application context relocation start and/or application context relocation completion. The application relocation may include application relocation start and/or application relocation completion. The load may include overload (overload).

In S303, before sending the notification message to the EEC, the source EES needs to determine whether an event that satisfies (satisfy) the condition for the service continuity event notification (a notification condition for short) occurs or information about the notification condition is detected. Satisfying the notification condition may be equivalently understood as matching (match) the notification condition or meeting the notification condition. The source EES may send the notification message to the EEC when detecting or determining any one or more of the following cases (1) to (14). It may also be understood that the source EES may determine that the notification condition is satisfied when detecting or determining any one or more of the following cases (1) to (14). When detecting or determining any one or more of the following cases (1) to (14), the source EES may determine that a current source EAS cannot provide a service that satisfies a service request for the terminal device, or determine that a service of the terminal device is degraded or interrupted. When detecting or determining any one or more of the following cases (1) to (14), the source EES may determine that the terminal device needs to connect to the target EAS, or determine that the terminal device needs to switch a data connection of an application layer to the target EAS. When detecting or determining any one or more of the following cases (1) to (14), the source EES may determine that the terminal device needs to perform application context relocation, or determine that one or more applications on the terminal device need to perform application context relocation.

(1) The terminal device moves outside a source EDN or a service area of the source EAS. It may also be understood as that the terminal device moves outside the source EDN or an optimal service area of the source EAS.

(2) If a data network access identifier DNAI of the terminal device changes, the source EES determines, based on a changed DNAI, that the terminal device moves outside the source EDN or the service area of the source EAS. It may also be understood as that the source EES determines, based on the changed DNAI, that the terminal device moves outside the source EDN or the optimal service area of the source EAS. Alternatively, a current DNAI does not belong to a group of DNAIs associated with the source EES (where the group of DNAIs associated with the source EES may be understood as a group of DNAIs associated with the EDN in which the source EES is located).

(3) A message for requesting application context transfer is received from the first device, where for example, the message may be an application context transfer/delivery request.

(4) A message for requesting application context relocation is received from the first device, where for example, the message may be an application context relocation request.

(5) The source EAS transfers a context to the target EAS.

(6) A message for requesting context relocation is received from the target EES, where for example, the message may be an application context relocation request.

(7) A message for requesting context transfer is received from the target EES, where a name of the message may be an application context transfer/delivery/retrieve request (application context transfer/delivery/retrieve request), and the message is for requesting to transfer an application context of the terminal device. For example, the target EAS requests the source EES to obtain a context of the source EAS, then the target EES requests the application context of the terminal device of the source EAS from the source EES, and the source EES requests the application context of the terminal device from the source EAS.

(8) The source EAS is overloaded or the source EDN is determined to be overloaded.

(9) The source EES initiates application context relocation.

(10) An address of the target EAS that is about to provide services for the terminal device is different from an address of the source EAS (or it is understood that an address of an EAS that serves an application of UE changes).

(11) The source EAS starts to transfer an application context to the target EAS.

(12) Application context transfer is complete.

(13) The source EAS requests to switch a network user plane path (UP path) of the terminal device.

(14) The source EES requests to switch the network user plane path of the terminal device.

The notification message in S303 may further include a specific event category (event category). The event category may be a cause value (cause value or cause code), which indicates an event or a reason that triggers (or causes) a service continuity event notification message. The event categories or cause values may be a group of enumerated values, for example, a group of enumerated character string values or a group of enumerated numeric values.

For example, when the source EES determines or detects the foregoing case (1) or (2), the event category (or cause value) carried in the notification message may be: mobility of the terminal device, inter-EDN (inter-EDN) mobility of the terminal device, or predictive inter-EDN mobility of the terminal device.

When the source EES determines or detects the foregoing case (3), (4), (5), (10), or (12), the cause value carried in the notification message may be that the source EAS triggers application context relocation.

When the source EES determines or detects the foregoing case (6) or (7), the event category (or cause value) carried in the notification message may be that the target EAS requests the application context.

When the source EES determines or detects the foregoing case (8), the event category (or cause value) carried in the notification message may be that the source EAS is overloaded.

When the source EES determines or detects the foregoing case (10), the event category (or cause value) carried in the notification message may be that information about a serving (serving) EAS changes.

When the source EES determines or detects the foregoing case (13), the event category (or cause value) carried in the notification message may be user plane path change.

The notification message in S303 may further include information about the target EAS, and an IP address or URL of the target EAS.

After receiving the notification message from the source EES, the EEC may perform the following operations:

(1) Request the information about the target EAS from the source EES. For example, the cause value carried in the notification message is: mobility of the terminal device, inter-EDN (inter-EDN) mobility of the terminal device, predictive inter-EDN mobility of the terminal device, the source EAS is overloaded, or the like. (2) The EEC initiates a configuration request to the ECS to obtain a new EES, and obtains the information about the target EAS from the new EES. (3) The EEC directly initiates an application instance discovery request to an obtained target EES (which has been obtained before the notification message is received), to obtain the information about the target EAS. Further, a process of application context transfer may be performed.

If the EEC has obtained the information about the target EAS, the EEC may further perform the following operation: Establish a connection to the target EAS, including establishing a new socket connection by an AC. Alternatively, the EEC sends the information about the target EAS to an AC, and triggers the AC to establish a connection to an application layer of the target EAS. Alternatively, the EEC notifies an AC that the application context transfer is complete, and triggers the AC to transfer uplink application data to the target EAS.

According to the embodiment in FIG. 4, the event category may include any one or more of the following: mobility of the terminal device, inter-EDN (inter-EDN) mobility of the terminal device, predictive inter-EDN mobility of the terminal device, load, application context transfer, application context relocation, a change in an address of the terminal device, or a change in an address of the EAS of the terminal device corresponding to the serving (serving) EEC.

The application context transfer may include one or more of application context push, application context pull, or completion of application context transfer. Application context relocation is also referred to as application relocation. The application context relocation may include application context relocation start and/or application context relocation completion. The application relocation may include application relocation start and/or application relocation completion. The load may include overload.

In S403, before sending the notification message to the source EAS, the source EES needs to determine whether an event that satisfies (satisfy) the condition for the service continuity event notification (a notification condition for short) occurs or information about the notification condition is detected. Satisfying the notification condition may be equivalently understood as matching (match) the notification condition or meeting the notification condition. The source EES may send the notification message to the source EAS when detecting or determining any one or more of the following cases (1) to (9). It may also be understood that when detecting or determining any one or more of the following cases (1) to (9), the source EES may determine that the notification condition is satisfied. Optionally, the source EES may further send the notification message to the source EAS when detecting or determining that the terminal device roams. It may also be understood that when detecting or determining that the terminal device roams, the source EES may further determine that the notification condition is satisfied.

When detecting or determining any one or more of the following cases (1) to (9), or when determining that the terminal device roams, the source EES may determine that a current source EAS cannot provide a service that satisfies a service request for the terminal device, or determine that a service of the terminal device is degraded or interrupted. When detecting or determining any one or more of the following cases (1) to (9), or when determining that the terminal device roams, the source EES may determine that the terminal device needs to connect to the target EAS. When detecting or determining any one or more of the following cases (1) to (9), or when determining that the terminal device roams, the source EES may determine that the terminal device needs to perform application context relocation, or determine that one or more applications on the terminal device need to perform application context relocation (It may also be understood that a serving EAS of an application of the S-EAS corresponding to the terminal device needs to be changed). When detecting or determining any one or more of the following cases (1) to (9), or when determining that the terminal device roams, the source EES may determine that the S-EAS needs to transfer or relocate the application context of the terminal device.

The notification message in S403 indicates occurrence of a service continuity event. The notification message may further include a specific event category, which may be a cause value (cause value or cause code). For detailed description of the event category and the cause value, refer to the description in the foregoing embodiments. Details are not described again.

When the source EES determines or detects the foregoing case (1) or (2), that the terminal device roams, or that an IP address of UE changes, the cause value carried in the notification message may be: mobility of the terminal device, inter-EDN (inter-EDN) mobility of the terminal device, or predictive inter-EDN mobility of the terminal device.

When the source EES determines or detects the foregoing case (3) or (4), the cause value carried in the notification message may be that the terminal device (for example, the EEC) triggers application context relocation.

When the source EES determines or detects the foregoing case (6) or (7), the cause value carried in the notification message may be that the target EAS requests the application context.

When the source EES determines or detects the foregoing case (8), the cause value carried in the notification message may be that the source EAS is overloaded or the source EDN is overloaded.

When the source EES determines or detects the foregoing case (2), the cause value carried in the notification message may be user plane path change.

The notification message in S403 may further include information about the target EAS, and an IP address or URL of the target EAS.

After receiving the notification message from the source EES, the source EAS may perform any one of the following operations:
  (1) Request the information about the target EAS from the source EES. Further, a process of application context relocation may be performed.
  (2) Initiate an application context relocation request to the source EES, and request the target EES and the source EES to find the target EES and assist in transferring the application context of the terminal.
  (3) Initiate an application context transfer request to the source EES, and request the source EES to assist in transferring the application context of the terminal.
  (4) Send data of the application context to the source EES.
  (5) Notify the AC of an address of a target application instance.
  (6) Send the data of the application context to the target EAS.

According to the embodiment in FIG. 5, the event category includes any one or more of the following: inter-EDN mobility of the terminal device, service recovery, service interruption, application context transfer, application context relocation, or a change in an address of the terminal device. The application context transfer may include one or more of application context push, application context pull, or completion of application context transfer. Application context relocation is also referred to as application relocation. The application context relocation may include application context relocation start and/or application context relocation completion. The application relocation may include application relocation start and/or application relocation completion.

In S503, before sending the notification message to the target EAS, the target EES needs to determine whether an event that satisfies (satisfy) the condition for the service continuity event notification (a notification condition for short) occurs or information about the notification condition is detected. Satisfying the notification condition may be equivalently understood as matching (match) the notification condition or meeting the notification condition. The target EES may send the notification message to the target EAS when receiving any one or more of the following information 1 to 4. It may also be understood that the target EES may satisfy the notification condition when receiving any one or more of the following information 1 to 4. When receiving any one or more of the following information 1 to 4, the target EES may determine that a current source EAS cannot provide a service that satisfies a service request for the terminal device, or determine that a service of the terminal device is degraded or interrupted. When receiving any one or more of the following information 1 to 4, the target EES may determine that the terminal device needs to be handed over to the target EAS. When receiving any one or more of the following information 1 to 4, the target EES may determine that the application context of the terminal device is transferred to the T-EAS. When receiving any one or more of the following information 1 to 4, the target EES may determine that the application context of the terminal device is transferred to the T-EAS.

The information received by the target EES may include:
  1. an EAS discovery request message from the source EES;
  2. a message for requesting application context transfer;
  3. a message for requesting application context relocation; and
  4. signaling or a data packet including the application context.

That the target EES receives the message for requesting application context transfer may include: (1) The target EES receives a context transfer request including at least one parameter of a terminal identifier (such as a UE identifier, an EEC identifier, or an AC identifier), the T-EAS, the S-EES, and the S-EAS that are sent by the terminal, or the target EES receives a context transfer request from the source EES. The context transfer request may be an application context transfer/delivery request. (2) The target EES receives a context transfer request from the source EES, where the request may carry an address of the target EAS, and optionally further carries an identifier of the terminal device.

That the target EES receives the message for requesting application context relocation may include: (1) The target EES receives an application context relocation request (application context relocation request) sent by the source EES. (2) The target EES receives a context relocation request including a terminal identifier (UE identifier, EEC identifier, or AC identifier) and at least one parameter of the T-EAS, the S-EES, and the S-EAS that are sent by the terminal device, where the context relocation request may be an application context relocation request. (3) The target EES receives a context transfer request including at least one parameter of a terminal identifier (UE identifier, EEC identifier, or AC identifier), the T-EAS, the S-EES, and the S-EAS that are sent by the terminal device, where the context transfer request may be an application context recovery request or an application context synchronization request.

The notification message in S503 may include information about the source EAS, for example, an address of the source EAS, or an address of the source EAS and an address of the source EES. The notification message in S503 may further include an identifier of the terminal device. The notification message in S503 may further include an address for obtaining the application context.

The notification message in S503 indicates occurrence of a service continuity event. The notification message may further include a specific event category, which may be a cause value (cause value or cause code).

When the target EES determines or detects the foregoing 2, 3, or 4, the cause value carried in the notification message may be that the terminal device triggers application context relocation.

When the target EES determines or detects the foregoing 1 or 4, the cause value carried in the notification message may be that the target EAS or the target EES pushes the application context of the terminal device, or there is an application context to be received.

When the target EES determines or detects the foregoing 1, 2, 3, or 4, the cause value carried in the notification message may be that information about a serving (serving) EAS changes.

The notification message in S503 may further include information about the source EAS (for example, an IP address or URL of the source EAS), and a new IP address of the terminal device. The notification message may further carry obtaining information (for example, a URL address, an IP address, and/or a port number) for a user context. The obtaining information may be from the target EES (the obtaining information is generated by the target EES, and in this case, a transmission path of the application context is from the source EAS to the source EES, to the target EES, and then to the target EAS) or the source EAS (the obtaining information is generated by the target EES, and a transmission path of the application context is from the source EAS to the target EAS without passing through the source EES and the target EES). The notification message further includes the information about the source EAS and information about the terminal device.

After receiving the notification message from the target EES, the target EAS may perform the following operations:
(1) When the target EAS receives the pushed application context of the terminal device, or receives the application context transfer request of the terminal device, or agrees to receive transfer of an application client of the terminal device, or agrees to provide a service for the application client of the terminal device, the target EAS invokes a context receiving service API of the target EES, or the target EAS sends a context receiving request message to the target EES. The target EAS carries, in the request message, an address (for example, a URL address/an IP address and a port number) for obtaining the application context received from the target EES.
(2) The target EAS may invoke an API provided by the target EES for application context transfer, application context synchronization, or application context recovery, to obtain the application context of the terminal device from the source EAS, the source EES, or the target EES. In this case, the target EAS specifies at least one of the source EES, the source EAS, or the identifier of the terminal device, to obtain the application context of the terminal device from the source EAS.

Figure 6:
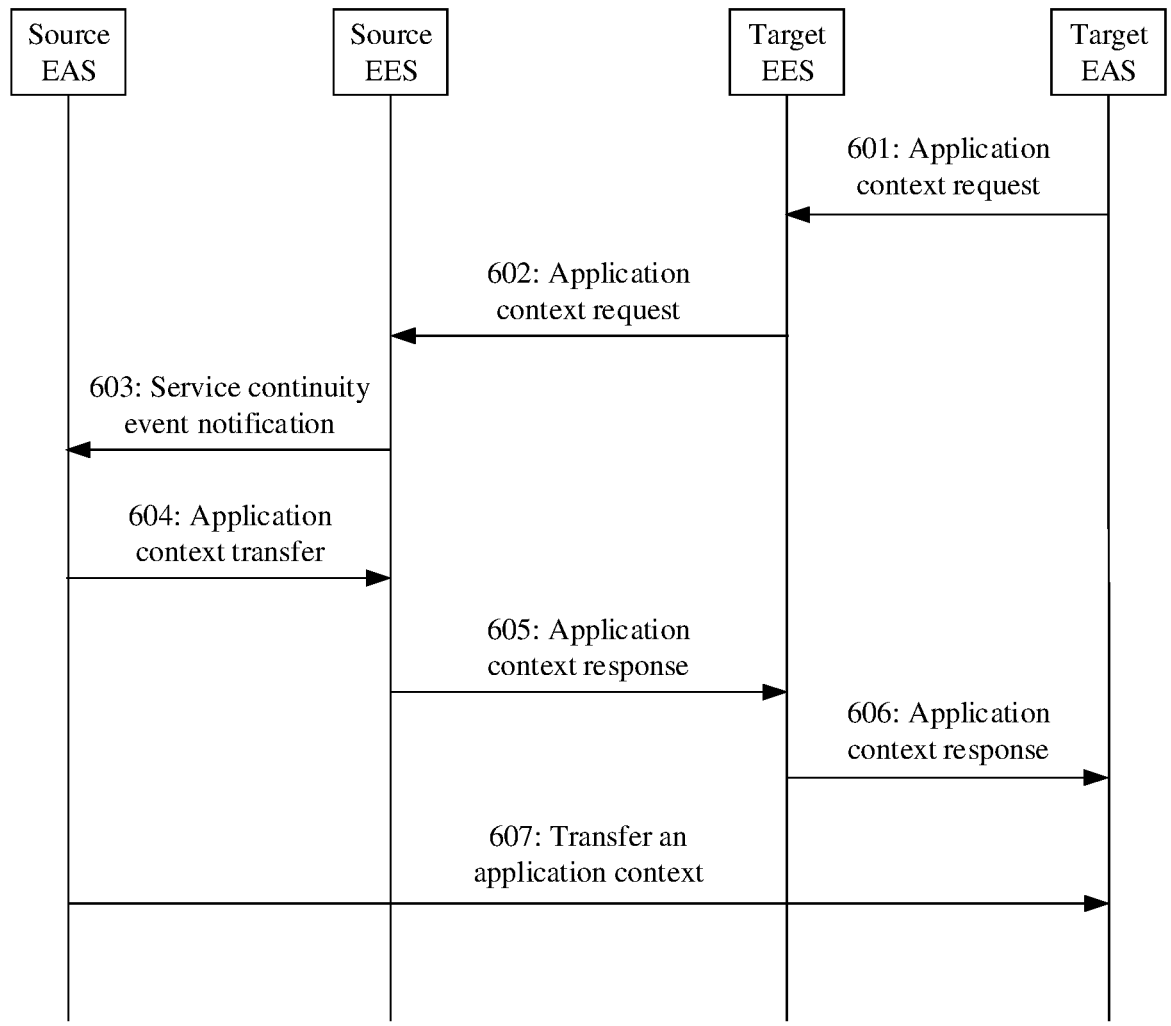
FIG. 6 is a schematic diagram of an operation procedure after a target EAS receives a notification message from a target EES according to an embodiment of this application.

Optionally, after receiving the notification message from the target EES, the target EAS may perform operations by using an example in FIG. 6.

S601: The target EAS invokes an application context request service API of the target EES, to obtain an application context.

An input parameter of the API includes an address for obtaining the application context. In an implementation, the address for obtaining the application context may include address information of the source EAS and information about the terminal device. In this case, the input parameter of the API may further include information about an EES corresponding to the source EAS. In another implementation, the address for obtaining the application context is provided by a source EES, that is, the application context is generated by the source EES. For example, the source EES finds a memory address block of the application context corresponding to the terminal device, and uses data corresponding to the address block as the application context.

S602: If the target EAS does not specify the source EES corresponding to the source EAS, the target EES finds the source EES corresponding to the source EAS based on the source EAS.

For example, if the target EES has cached the source EES corresponding to the source EAS, or a correspondence between an EES and an address segment served by the EES is configured on the source EES, the target EES finds a corresponding source EES based on address information of the target EAS. The target EES invokes a context request service API of the source EES. An input parameter of the API includes an address of the source EAS and the information about the terminal device. The context request service API of the source EES may also be referred to as a context transfer service API.

S603: Optionally, if the source EAS is responsible for UE context management, the source EES further sends a service continuity notification message, that is, a notification message corresponding to API-1, to the source EAS. Otherwise, if the source EES manages an application context of the UE, the source EES directly performs step S605.

S604: If the source EAS accepts the request, the source EAS invokes the context transfer service API of the source EES.

The source EAS may include application context data of the terminal device in the API, and indicate to accept the context request.

S605: The source EES sends, to the target EES, the context received from the source EAS, or the source EES obtains data of the application context of the terminal device and sends the data to the target EES.

The data of the application context of the terminal device may be, for example, a specific memory block on a virtual machine. For example, the source EES finds a memory address block of the application context corresponding to the terminal device, and uses data corresponding to the address block as the application context.

S606: The target EES sends the data of the application context of the terminal device to the target EAS.

S607: Transfer the application context of the terminal device.

If a data amount is large, in S601 to S606, the target EAS may negotiate with the source EAS or source EES to use an out-of-band mode for transmission, that is, the data of the application context is transmitted in an independent media data channel rather than in a signaling message. After S601 to S606 are performed, the source EAS or source EES sends the data to the target EAS over the data channel.

It should be noted that in embodiments of this application, the embodiments in FIG. 3, FIG. 4, and FIG. 5 may coexist, or some of the embodiments may exist. In this embodiment of this application, application context relocation can be triggered via a subscription notification service between the source EES and the source EAS and/or the EEC and via a subscription notification service between the target EES and the target EAS. The following uses a procedure for application context relocation in an application scenario as an example to further describe the service continuity event notification method provided in this embodiment of this application.

Figure 7:
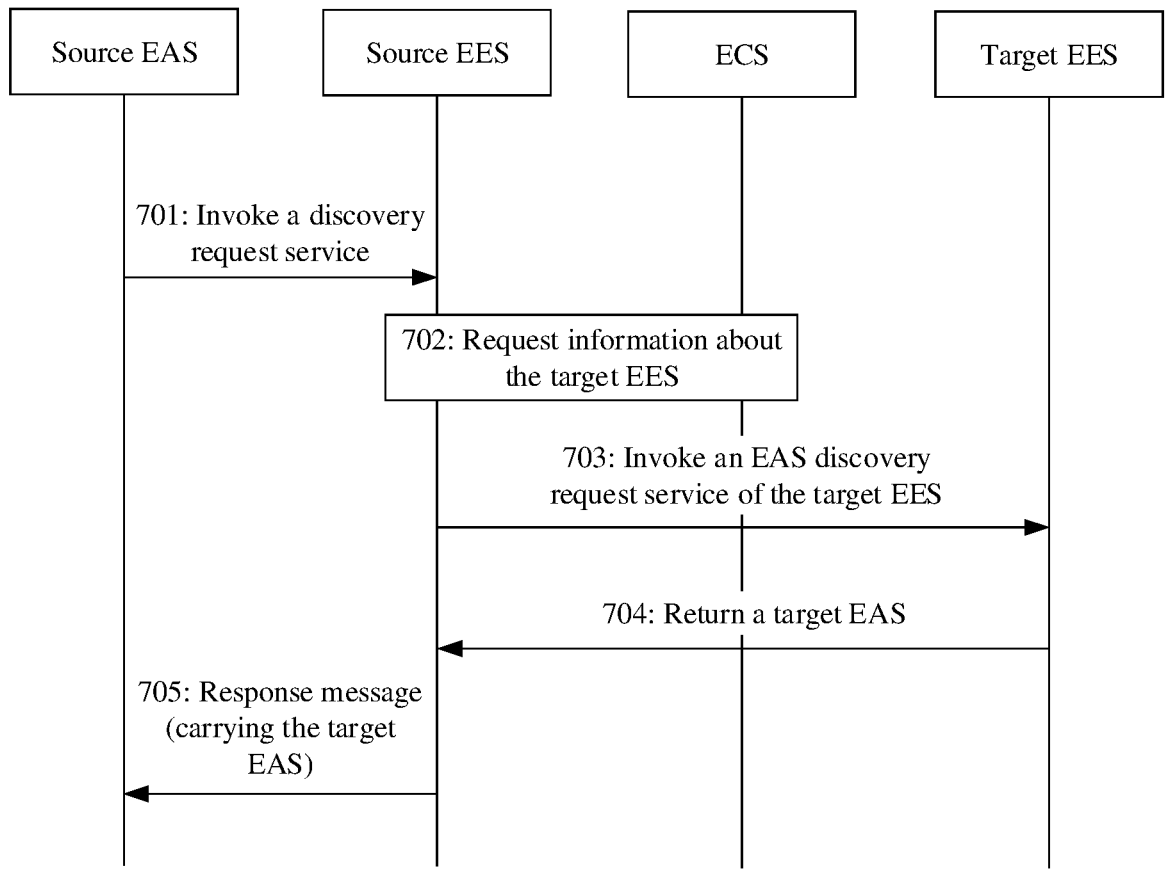
FIG. 7 is a first schematic flowchart of an application context relocation method according to an embodiment of this application.

In the embodiment in FIG. 7, it is assumed that a source EAS has obtained information about a source EES.

S701: The source EAS invokes an EAS discovery request (edge application server discovery request) service of the source EES.

The source EAS may detect that the source EAS cannot continue to provide a service that satisfies a service requirement of a terminal device for the terminal device. For example, the source EAS finds that load of the source EAS exceeds a preset threshold, or the EAS detects that the terminal device moves outside a service area of the source EAS, or the EAS detects that the terminal device moves outside an EDN in which the current EAS is located. Alternatively, the source EAS previously subscribes to a service continuity event notification from an EES, and receives the service continuity event notification sent by the source EES. Particularly, the service continuity event notification further includes the following event categories: the terminal device moves/the terminal device moves outside the EDN or a(n) (optimal) service area of the source EAS, the terminal device roams, an IP address of the terminal device changes, or the EDN or the EAS is overloaded.

S702: After receiving the EAS discovery request, the source EES checks whether the source EAS initiating a request is authorized to perform a discovery operation of the EAS. If the authorization succeeds, further, if the source EES determines that the requested EAS is served locally, the source EES may directly perform S705. Otherwise, the source EES sends an EES request message to the ECS to obtain the EES. The EES request message may further carry an identifier of an application, an identifier of the terminal device, or a location of the terminal device. The ECS retrieves, based on the EES request message, information about the EES (referred to as a target EES) that matches the EES request message, and returns the information about the target EES that satisfies a condition to the source EES.

S703: The source EES invokes an EAS discovery request service of the target EES. The EAS discovery request may carry an identifier of an application, an identifier of the terminal device, or a location of the terminal device.

S704: The target EES selects a target EAS that matches the EAS discovery request, and returns the target EAS to the source EES.

S705: The source EES sends an EAS discovery response message to the source EAS, where the EAS discovery response message carries information about the discovered target EAS.

The source EES may send a service continuity event notification message to the EES after step S701. The message may carry an event category that an EAS serving a terminal changes, and further carry address information of the target EAS.

According to the embodiment in FIG. 7, the source EAS obtains the information about the target EAS.

Figure 8:
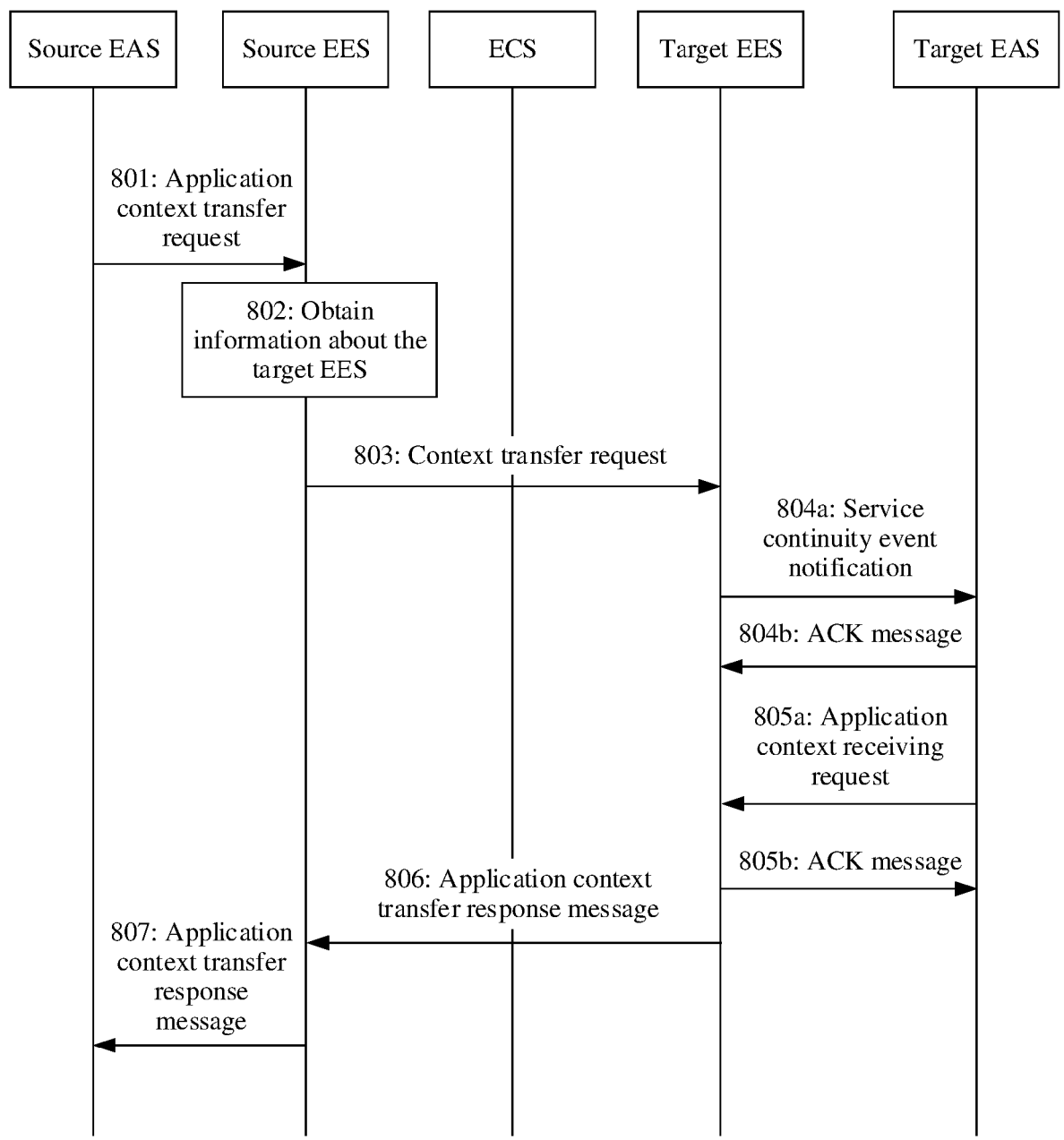
FIG. 8 is a second schematic flowchart of an application context relocation method according to an embodiment of this application.

In the embodiment in FIG. 8, it is assumed that a source EAS has obtained information about a source EES.

S801: The source EAS sends an application context transfer (transfer) request or an application context delivery (deliver) request to the source EES.

It may also be understood that the source EAS invokes a context transfer (transfer) service API of the source EES or invokes a context delivery (deliver) service API of the source EES. An input parameter of the API may also be considered as a parameter carried in the application context transfer request. The application context transfer request carries address information (for example, an IP address, and an IP address and a port number/a URL address) of the target EAS. Optionally, the application context transfer request further carries information corresponding to a target EES (the target EES is an EES with which the target EAS is registered) and identification information of the terminal device. If the identification information of the terminal device is carried, it indicates that an application context of the terminal device is delivered. If the identification information of the terminal device is specified, it may indicate that all application contexts related to an application are transferred, which may include corresponding application contexts of all terminal devices served by the source EAS. If a data amount of the application context is small, the source EAS may directly include data of the application context in the application context transfer request message. In addition, the application context transfer request may further carry a context transfer capability supported by the source EAS, for example, a compression mode and/or a transmission protocol, and security information such as a key for context encryption and decryption or information for generating a key. When the data amount of the application context is large, the context may be sent in an out-of-band mode. In this case, the application context transfer request may further carry information about an address for obtaining the application context.

S802: If the source EAS does not carry the information about the target EES, the source EES obtains the information about the target EES based on the address information of the target EAS. The information about the target EES includes an address (for example, an IP address, and an IP address and a port number/a URL address) of the target EES.

Specifically, the source EES may obtain the information about the target EES in any one of the following manners.

(1) The IP address of the target EAS is the IP address of the EES.

(2) The address of the corresponding EES is obtained through DNS based on some fields in the URL of the target EAS.

(3) The source EES is preconfigured with a mapping relationship between address information of another EES and an address list supported by the EES. The address list may be an IP address segment, a group of IP addresses, or a group of URL lists. The source ESS selects an EES that matches the address information of the target EAS, where the address of the target EAS is in the address list supported by the EES.

(4) The source EES sends a request message to an ECS to request the information about the target EES. The request message carries the address of the target EAS. The ECS is preconfigured with a mapping relationship between address information of another EES and an address list supported by the EES. The address list may be an IP address segment, a group of IP addresses, or a group of URL lists. The ECS selects an EES that matches the address information of the target EAS, where the address of the target EAS is in the address list supported by the EES. The ECS returns the address of the target EES to the EES.

S803: The source EES sends a context transfer (transfer) request or a delivery (deliver) request to the target EES.

The context transfer request carries a transmission media parameter for context transfer supported by the EES, for example, including one or more of the following parameters:

a compression mode, a transmission protocol, a supported security capability (an algorithm and a key), source address information (an IP address and a port number) of the source EES for context transfer, or an address (an IP address or a URL) for obtaining an application context. The context transfer request further carries information sent by the EAS in S801, and the information may be placed in a container (container).

This step may be understood as follows: The source EES invokes a context transfer (transfer) request service API of the target EES, or invokes a context delivery (deliver) request service API of the target EES.

Optionally, the context transfer request message may carry data of the application context.

S804a: The target EES sends a service continuity event notification message to the target EAS, where the service continuity event notification message carries a service continuity event (or trigger) category. For a specific event category, refer to related descriptions of sending a service continuity event notification by the target EES to the target EAS in the foregoing embodiment. For example, the service continuity event (or trigger) is application context delivery. Alternatively, the service continuity event (or trigger) is application context delivery (delivery). Alternatively, the service continuity event (or trigger) is application context push (push). Optionally, information about the service continuity event notification carries the address (IP or URL) for obtaining the application context. The address for obtaining the application context may be provided by the source EAS, for example, carried in S801, or generated by the source EES and carried in S803, or generated by the target EES. Optionally, the service continuity event notification message may carry the data of the application context.

S804b: The target EAS sends an ACK acknowledgment message. This step is optional.

S805a: If the target EAS accepts the application context of the terminal device, but the application context is not carried in S804a, the target EAS sends an application context receiving request to the target EES. This may be understood as that the target EAS invokes a context receiving service API of the target EES. It may also be understood that the target EAS invokes a context data transmission interface provided by the target EES. The application context receiving request may carry media parameters (for example, an IP address, a port, and a protocol) supported by the target EAS.

S805b: The target EES returns an acknowledgment (ACK) message to the target EAS, where the ACK message may carry media parameters (for example, an IP address, a port, a URL address, a transmission protocol, a coding format, and a compression format) for context transfer between the target EES and the target EAS, and may further carry a parameter (container in S803) carried in step 801 by the target EAS. The ACK message may further carry address information (an IP address and a port number, or a URL address) for obtaining the application context. The address information may be address information from the target EES for obtaining the application context, or address information from the source EAS for obtaining the application context, or address information from the source EES for obtaining the application context.

S806: The target EES returns an application context transfer response message or an application context delivery message to the source EES. The application context transfer response message may carry media parameters {compression mode, transmission protocol, supported security capability (an algorithm and a key), and address information (an IP address and a port number) for receiving context transfer by the target EES} selected (or supported) by the target EES for application context delivery.

This step may be understood as API callback in S803.

S807: The source EES returns the application context transfer response message or the application context delivery message to the source EAS.

The application context transfer response message carries media description information used by the source EAS to send a context. For example, the source EES receives a media parameter {IP address and port number, protocol, optional supported security capability (an algorithm and a key)} of the application context. Alternatively, the application context transfer response message further carries the media parameters (from step 805a) for receiving the application context by the target EAS.

This step may be understood as API callback in S801.

S808: If the out-of-band mode is used, the source EAS sends the data of the application context of the terminal device to the source EES.

In the embodiment in FIG. 5, S503 may be performed in S804a in the embodiment in FIG. 8.

Figure 9:
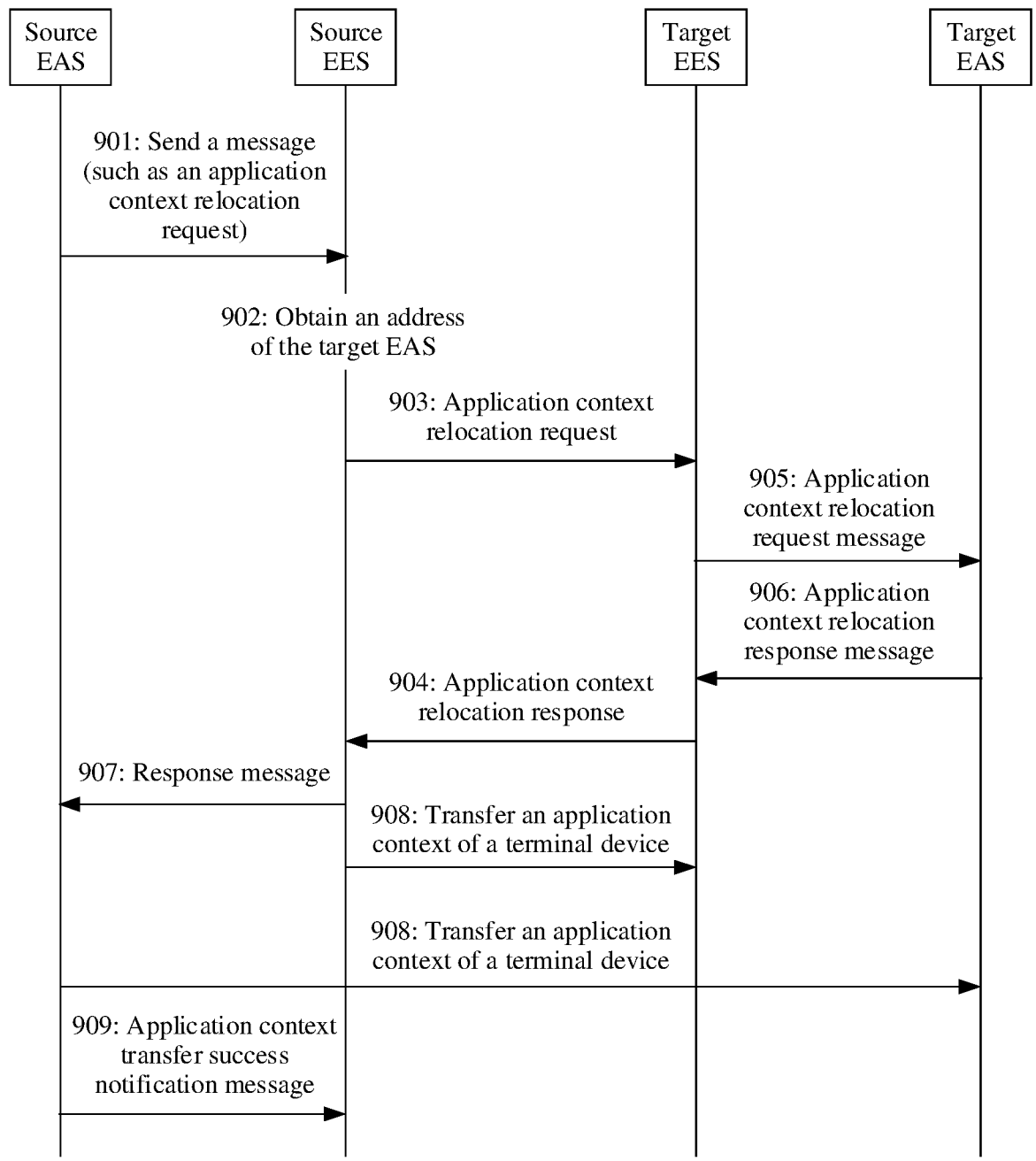
FIG. 9 is a third schematic flowchart of an application context relocation method according to an embodiment of this application.
Figure 10B:
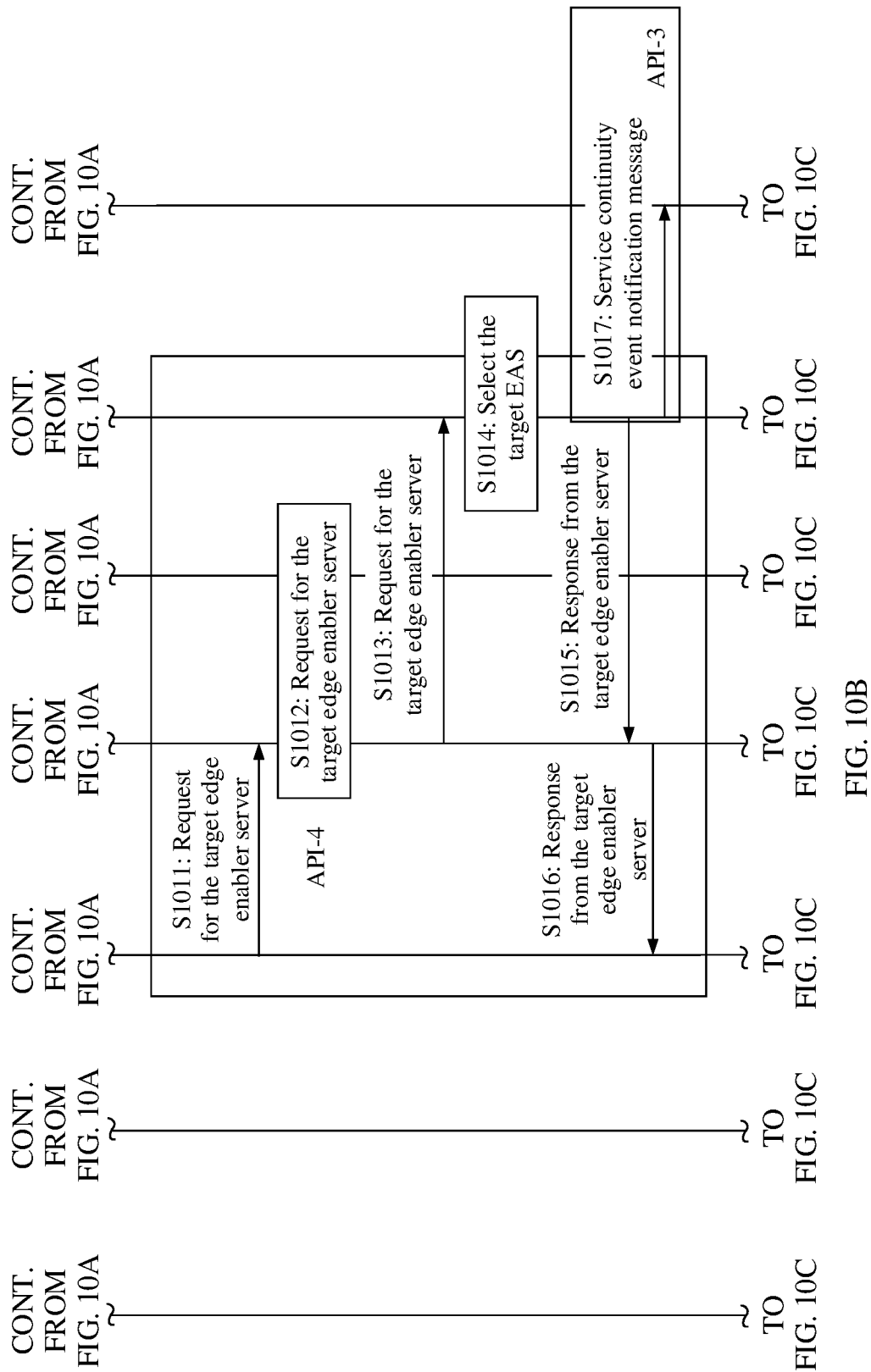
Figure 10D:
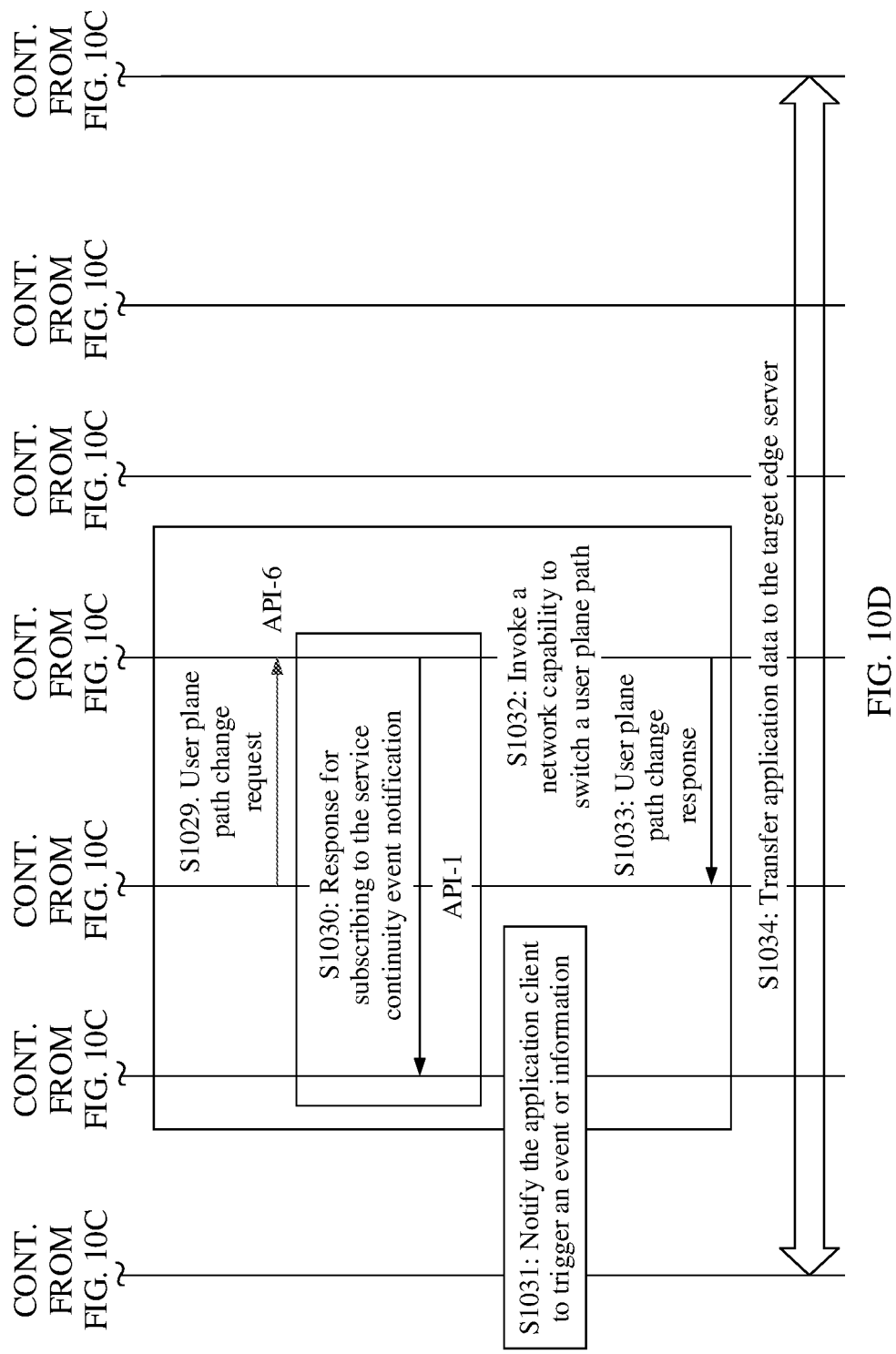

As shown in FIG. 9, with reference to a procedure of application context relocation in an application scenario, the service continuity event notification method provided in this embodiment of this application is further described. A specific process is described below.

S901: A source EAS sends a message to a source EES, for example, the message is an application context relocation request (application context relocation request), and the source EES receives the message from the source EAS.

The message may carry the following parameter: information about a terminal device. For example, the information about the terminal device may be at least one of the following: an identifier of the terminal device, a location of the terminal device, an identifier of an application client, or an identifier of an application user. The application context relocation request may further carry the identifier of the application, such as an FQDN, a URL address, an EAS ID, or address information such as an IP address or a URL address of the source EAS.

In an implementation, S901 may be further implemented in the following manner. A form of service (service) API invoking is used. To be specific, the source EAS invokes an application context relocation API of the source EES, and provides an input parameter of the API. The input parameter is the same as a parameter in a context relocation request. The application is an executable software that can implement a specific function, for example, various applications (application, APP) on a mobile terminal.

S902: The source EES obtains an address of a target EES. The address of the target EES is, for example, an IP address, a port number, or a URL address. The source EES may further obtain an identifier of the target EES.

The source EES may obtain the address of the target EES from an edge data network configuration server (edge data network configuration server, EDN CS).

S903: The source EES sends the application context relocation (relocation) request to the target EES, to request an application context, and the target EES receives the application context relocation request from the source EES.

The application context relocation request may include an identifier of at least one terminal device, the identifier of the application, the address information of the source EAS, and a core network-related subscription context.

The target EES selects or determines a target EAS based on the application context relocation request.

S904: The target EES sends an application context relocation (relocation) response to the source EES, and the source EES receives the application context relocation (relocation) response from the target EES.

The application context relocation (relocation) response indicates whether to allow (or accept) relocation of an application of the terminal device, and also indicates whether to accept relocation of the application of the terminal device. Whether relocation of the application of the terminal device is allowed may be specifically understood as whether relocation of a context of the application of the terminal device is allowed, or whether relocation of the context of the application of the terminal device is accepted. The target EES may determine, based on a case whether information about an EAS managed by the target EES includes an EAS corresponding to the application of the terminal device, or based on load of the EAS corresponding to the application of the terminal device, whether to allow relocation of the application of the terminal device.

After S903 and before S904, optionally, the following steps may be further included.

S905: The target EES sends an application context relocation (relocation) request message to the target EAS, to request to relocate an application context of the terminal device. The target EAS receives the application context relocation request message from the target EES.

The target EAS is the target EAS determined by the target EES in step S903.

The message includes the identifier of the terminal device, and may further include information about a core network element connected to the application of the terminal device. The application of the terminal device is the same as an application corresponding to the target EAS.

S906: The target EAS returns an application context relocation response message to the target EES, in response to the message received in S905. The target EES receives the application context relocation response message from the target EAS.

The response message may carry the information about the terminal device. For interpretation of the information about the terminal device, refer to the foregoing interpretation of the information about the terminal device.

After S904, the following steps may be further included.

S907: The source EES sends a response to the message received in S901 to the source EAS. For example, the message in S901 is the application context relocation request, and the response message is the application context relocation response message. The source EAS receives the response message from the source EES. For example, the source EAS receives the application context relocation response message from the source EES.

The message may indicate that the source EAS may start to relocate the application of the terminal device, or may be understood as that the source EAS may start to transfer the application context of the terminal device, or indicate that a context transfer channel is established. The message may include the information about the terminal apparatus, an address of the target EAS (an IP address or a URL address of the target EAS), and receiving information for transferring the application context, such as an IP address and/or a port number of a receiver side (the target EES or the target EAS).

S908: Transfer the application context of the terminal device.

In an implementation, the source EES transfers (transfer) the application context of the terminal device to the target EES, and the target EES receives the application context of the terminal device sent by the source EES.

The source EES and the target EES may perform context transfer through a negotiated port for application transfer.

In another implementation, the source EAS transfers the application context of the terminal device to the target EAS, and the target EAS receives the application context of the terminal device sent by the source EAS.

The source EAS and the target EAS may perform context transfer through a port allocated by the target EAS in S906 for application transfer.

In still another implementation, the source EAS transfers the application context of the terminal device to the target EES via the source EES, and the target EES transfers the received application context of the terminal device to the target EAS.

S909: Optionally, the source EAS sends an application context transfer success notification message to the source EES.

According to the embodiment in FIG. 9, operations of some devices in the embodiments in FIG. 3 to FIG. 5 may be implemented in some steps in the embodiment in FIG. 9.

For example, the source EES sends the notification message to the EEC in S303. After receiving the application context relocation response message in S907, the source EES may trigger sending of the notification message to the EEC.

When the source EES detects or determines that a condition for a service continuity event notification is satisfied, after step S901 is performed, the source EES may determine that the condition for the service continuity event notification is satisfied. That the message for requesting application context relocation is received from the first device described in case (4) may be performed in S901. That the address of the target EAS is different from the address of the source EAS described in case (10) may be performed after S904. That the source EAS transfers the context to the target EAS described in case (5) may be performed in S908.

That application context transfer is complete described in case (12) may be determined in S909.

Case (13) may be determined when the source EES receives a message from the source EAS for requesting to switch the network user plane path of the terminal device.

In the information received by the target EES, the EAS discovery request message from the source EES described in information 1 may be performed in S903.

In the information received by the target EES, the message for requesting application context transfer described in information 2 may be performed in S903.

As shown in FIG. 10A to FIG. 10D, with reference to a procedure for implementing application context transfer in an application scenario, a service continuity event notification method provided in this embodiment of this application is further described. A specific process is described below.

S1001: An EEC sends a subscription message for an application context transfer event notification to a source EES, and the source EES receives, from the EEC, a subscription message for a service continuity event notification.

A specific description of this step is the same as that of S301. The EEC may trigger S1001 when an application client registers with the EEC, when the application client invokes an edge application server discovery API of the EEC, when the application client is installed on an operating system, when the EEC obtains the EES from the ECS after a service configuration procedure is completed, or the like.

S1002: The source EES stores subscription information.

A specific description of this step is the same as that of S302.

S1003: The source EES returns a response message of the subscription message to the EEC. This step is optional.

After receiving the subscription request from the EEC, the source EES returns the response message of the subscription message to the EEC, indicating that the subscription is successful.

Steps S1001 to S1003 and a subsequent operation that the service continuity event notification sent by the source EES to the EEC may form a service API (denoted as API-1 herein) provided by the source EES. The API may provide the service continuity event notification for the EEC.

S1004: Optionally, the application client and a source application edge server establish a connection, to exchange an application service and data.

S1005: The source EAS sends a subscription message for the application context transfer event notification to the source EES, and the source EES receives, from the source EAS, the subscription message for the service continuity event notification.

A specific description of this step is the same as that of S401. The source EAS may trigger S1005 after the application client is connected to the EAS or the source EAS is registered with the EES.

S1006: The source EES stores the subscription information.

A specific description of this step is the same as that of S402.

S1007: The source EES returns the response message of the subscription message to the source EAS. This step is optional.

After receiving the subscription request from the source EAS, the source EES returns the response message of the subscription message to the source EAS, indicating that the subscription is successful.

Steps S1005 to S1007 and a subsequent operation that the service continuity event notification sent by the source EES to the source EAS may form a service API (denoted as API-2 herein) provided by the source EES. The API may provide the service continuity event notification for the EAS.

S1008: A target EAS sends a subscription message for the application context transfer event notification to a target EES, and the source EES receives, from the target EAS, the subscription message for the service continuity event notification.

A specific description of this step is the same as that of S501. The target EAS may trigger S1005 after the target EAS is registered with the EES.

S1009: The target EES stores subscription information.

A specific description of this step is the same as that of S502.

S1010: The target EES returns a response message of the subscription message to the target EAS. This step is optional.

After receiving the subscription request from the target EAS, the target EES returns the response message of the subscription message to the target EAS, indicating that the subscription is successful.

Steps S1008 to S1010 and a subsequent operation that the service continuity event notification sent by the source EES to the source EAS may form a service API (denoted as API-3 herein) provided by the target EES. The API may provide the service continuity event notification for the EAS.

API-2 and API-3 may alternatively be combined into one API (referred to as API-X herein). The API may provide corresponding service continuity event notifications in API-2 and API-3 without distinguishing whether a subscriber is the source EAS or the target EAS. Invoking API-1 by the EEC, invoking API-2 by the source EAS, and invoking API-3 by the target EAS are independent of each other or may be simultaneously performed.

Functions implemented in the following S1011 to S1016 are a service API (denoted as API-4 herein) for EAS discovery provided by the source EES.

S1011: The source EAS invokes an EAS discovery request (edge application server discovery request) service of the source EES.

For details of this step, refer to S701.

S1012: The source EES obtains information about the target EAS, and if there is no information about the EAS matching the request in S1011, the source EES obtains information about the target EES.

For specific description of this step, refer to S702.

S1013: The source EES invokes an EAS discovery request service of the target EES.

For specific description of this step, refer to S703.

S1014: The target EES selects a target EAS that matches the EAS discovery request.

For specific description of this step, refer to S704.

S1015: The target EES sends an EAS discovery response message to the source EES.

The EAS discovery response message includes the information about the target EAS.

S1016: The source EES sends the EAS discovery response message to the source EAS.

For specific description of this step, refer to S705.

S1017: After the target EES receives the request message in step S1013 and selects the target EAS, the target EES sends the service continuity event notification to the target EAS, where S1017 is a notification message corresponding to API-3. The message further includes address information of the source EAS and an identifier of a terminal device.

Functions implemented in the following S1018 to S1025 are a service API (denoted as API-5 herein) that is provided by the source EES for transferring an application context. Details are provided below.

S1018: The source EAS sends an application context transfer (transfer) request or an application context delivery (deliver) request to the source EES.

For specific description of this step, refer to S801.

S1019: The source EES sends a context transfer (transfer) request or a delivery (deliver) request to the target EES.

For specific description of this step, refer to S802 and S803.

S1020: The target EES sends a service continuity event notification message to the target EAS.

For specific description of this step, refer to S804a.

S1021: The target EAS sends a response message of the notification.

For specific description of this step, refer to S804b.

S1022: The target EAS invokes a context receiving service API of the target EES.

For specific description of this step, refer to S805a.

S1023: The target EES returns an acknowledgment (ACK) message to the target EAS.

For specific description of this step, refer to S805b.

S1024: The target EES returns an application context transfer response message or an application context delivery message to the source EES.

For specific description of this step, refer to S806.

S1025: The source EES returns the application context transfer response message or the application context delivery message to the source EAS.

For specific description of this step, refer to S807.

Functions of API-4 and API-5 may also be combined into one API (denoted as API-Y herein), and the API is for transferring an application of an enabler terminal, that is, transferring an application context of the terminal. For specific function descriptions, refer to the description of the embodiment shown in FIG. 9.

S1026: The source EAS sends the data of the application context of the terminal device to the source EES.

For specific description of this step, refer to S808.

S1027: The source EES sends the service continuity event notification message to the EEC.

This step is a notification message corresponding to API-1. The notification may carry the following event categories: context delivery, or context delivery complete. Further, the notification message further includes address information of the target EAS. This step is optional.

S1028: The EEC provides a corresponding event notification and information for an AC.

The EEC may provide the following event for the AC: context transfer, or context transfer complete. Further, the EEC may further provide the address information of the target EAS for the AC. This step is optional.

Functions implemented in the following S1029, S1032, and S1033 are a user plane path change service API (referred to as API-6 herein) provided by the source EES. Details are provided below.

S1029: The source EAS sends a user plane path change request to the source EES. The request requests to switch a user plane path of a user to a target path.

S1032: The source EES invokes an AF request of a network or sends an acknowledgment message of the AF request to the network, to indicate a network layer to switch a user plane path corresponding to the application of the terminal device.

S1033: The source EES sends a user plane path change response to the source EAS. This step is optional.

When the source EES receives the message in S1029, the source EES may send the service continuity event notification message corresponding to API-1 to the EEC. In addition, the notification message may indicate that the event category is user plane path change.

S1031: The EEC provides a corresponding event notification and information for the AC.

The EEC may provide the AC with an event that the user plane path change is completed. This step is optional. In this way, the AC may transfer service data to the target EAS.

S1034: After application context transfer and user plane path change are completed, the AC may interact with the target EAS for application data through a latest user plane path.

It may be understood that API-1, API-2, API-3, API-4, API-5, API-6, API-X, API-Y, and the like may be independently executed, or may be executed in a combination.

In the foregoing embodiments provided in this application, the method provided in embodiments of this application is described from the perspective of interaction between devices such as the source EES, the source EAS, the EEC, the target EES, or the target EAS. An embodiment of this application further provides a communication apparatus, to implement functions in the method provided in the foregoing embodiments of this application. The communication apparatus may include a hardware structure and/or a software module, and implement the foregoing functions in a form of a hardware structure, a software module, or a combination of a hardware structure and a software module. Whether a function in the foregoing functions is performed by using the hardware structure, the software module, or the combination of the hardware structure and the software module depends on particular applications and design constraints of the technical solutions.

Figure 11:
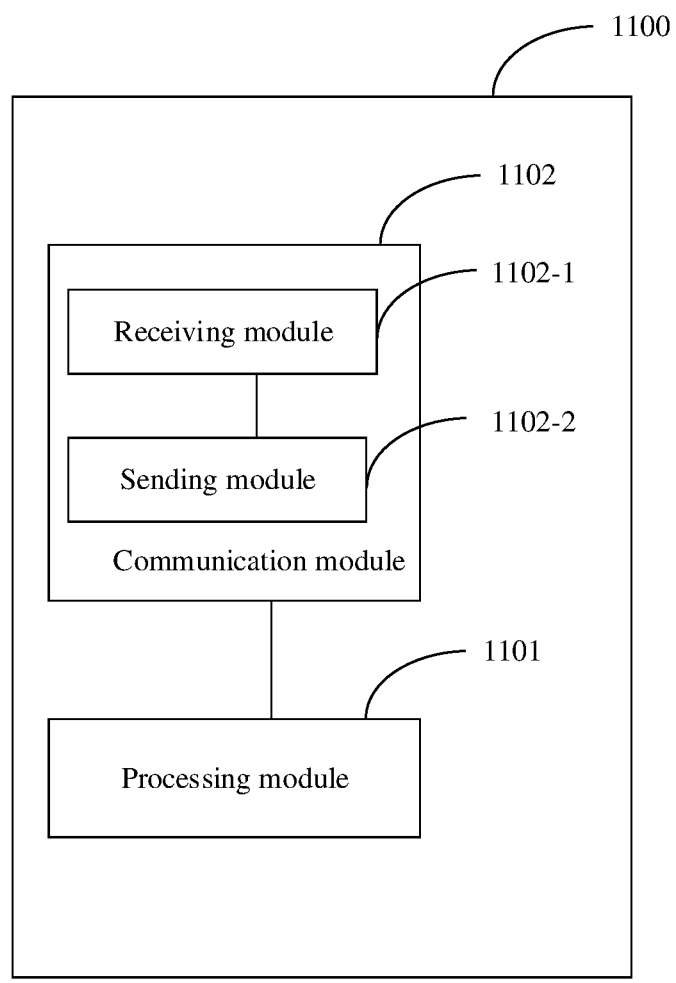
FIG. 11 is a first schematic diagram of a structure of a communication apparatus according to an embodiment of this application.

As shown in FIG. 11, based on a same technical concept, an embodiment of this application further provides a communication apparatus 1100. The communication apparatus 1100 may be a source EES, a source EAS, an EEC, a target EES, or a target EAS, or may be an apparatus in the source EES, the source EAS, the EEC, the target EES, or the target EAS, or may be an apparatus that can be used in pairs with the source EES, the source EAS, the EEC, the target EES, or the target EAS. In a design, the communication apparatus 1100 may include modules for performing the methods/operations/steps/actions performed by the source EES, the source EAS, the EEC, the target EES, or the target EAS in the foregoing method embodiments. The modules may be hardware circuits, may be software, or may be implemented by using a combination of a hardware circuit and software. In a design, the communication apparatus 1100 may include a processing module 1101 and a communication module 1102. The processing module 1101 is configured to invoke the communication module 1102 to perform a receiving function and/or a sending function. The communication module 1102 further includes a receiving module 1102-1 and a sending module 1102-2.

For example, when the communication apparatus 1100 is configured to perform an operation performed by an edge enabler server EES, the receiving module 1102-1 is configured to receive a subscription message from a first device, where the subscription message is for requesting to subscribe to a service continuity event notification; and the sending module 1102-2 is configured to send a notification message to the first device when a condition for the service continuity event notification is satisfied.

When the communication apparatus 1100 is configured to perform an operation performed by the first device, the sending module 1102-2 is configured to send a subscription message to an edge enabler server EES, where the subscription message is for requesting to subscribe to a service continuity event notification; and the receiving module 1102-1 is configured to receive a notification message from the EES.

The EES is the source EES, and the first device may be the EEC or the source EAS.

The EES is the target EES, and the first device may be the target EAS.

The receiving module 1102-1 and the sending module 1102-2 may be further configured to perform other operations performed by the source EES, the EEC, the source EAS, the target EES, or the target EAS in the foregoing method embodiments. Details are not described herein again.

Division into modules in embodiments of this application is an example, and is merely logical function division. During actual implementation, there may be another division manner. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

Figure 12:
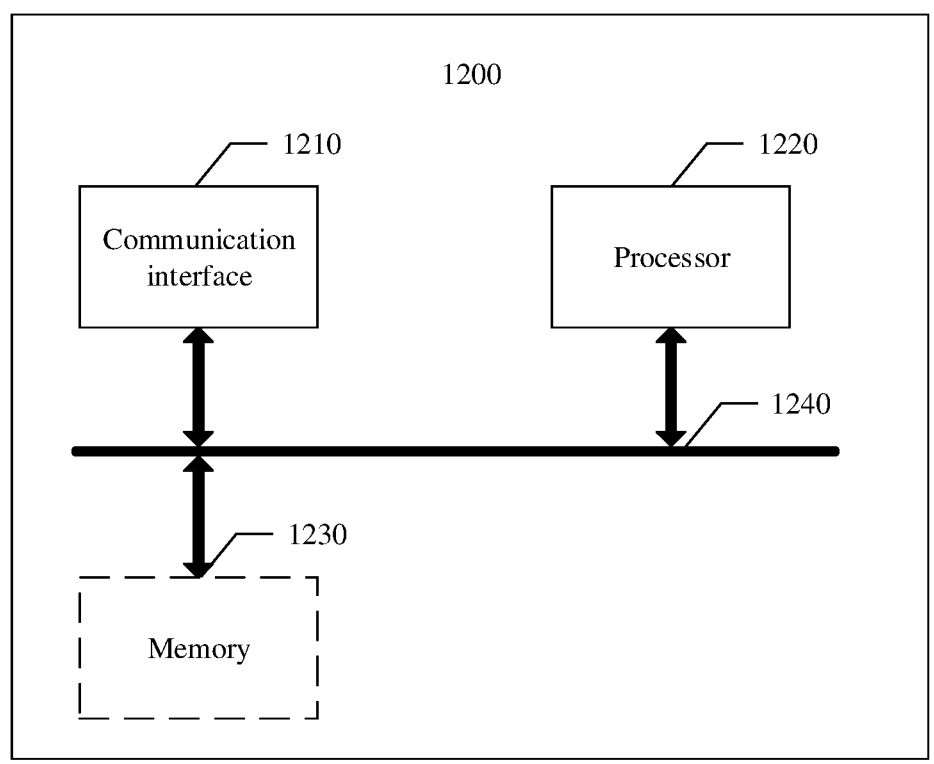
FIG. 12 is a second schematic diagram of a structure of a communication apparatus according to an embodiment of this application.

FIG. 12 shows a communication apparatus 1200 according to an embodiment of this application. The communication apparatus 1200 is configured to implement functions of the source EES, the source EAS, the EEC, the target EES, or the target EAS in the foregoing method. The communication apparatus may be the source EES, the source EAS, the EEC, the target EES, or the target EAS, or may be an apparatus in the source EES, the source EAS, the EEC, the target EES, or the target EAS, or may be an apparatus that can be used in pairs with the source EES, the source EAS, the EEC, the target EES, or the target EAS. The communication apparatus 1200 may be a chip system. In this embodiment of this application, the chip system may include a chip, or may include the chip and another discrete component. The communication apparatus 1200 includes at least one processor 1220, configured to implement the method provided in embodiments of this application. The communication apparatus 1200 may further include a communication interface 1210. In this embodiment of this application, the communication interface may be a transceiver, a circuit, a bus, a module, or a communication interface of another type, and is configured to communicate with another device by using a transmission medium. For example, the communication interface 1210 is used for an apparatus in the communication apparatus 1200 to communicate with another device.

The processor 1220 and the communication interface 1210 may be configured to perform steps or operations performed by the source EES, the source EAS, the EEC, the target EES, or the target EAS in the foregoing method embodiments. Details are not described herein again.

The communication apparatus 1200 may further include at least one memory 1230, configured to store program instructions and/or data. The memory 1230 is coupled to the processor 1220. The coupling in embodiments of this application is an indirect coupling or a communication connection between apparatuses, units, or modules in an electrical form, a mechanical form, or another form, and is used for information exchange between the apparatuses, the units, or the modules. The processor 1220 may operate in collaboration with the memory 1230. The processor 1220 may execute the program instructions stored in the memory 1230. At least one of the at least one memory may be included in the processor.

In this embodiment of this application, a specific connection medium between the communication interface 1210, the processor 1220, and the memory 1230 is not limited. In this embodiment of this application, the memory 1230, the processor 1220, and the communication interface 1210 are connected through a bus 1240 in FIG. 12. The bus is represented by using a bold line in FIG. 12. The foregoing is merely an example for description. A connection manner of other components is not limited thereto. The bus may be classified as an address bus, a data bus, a control bus, and the like. For ease of representation, only one thick line is for representing the bus in FIG. 12, but this does not mean that there is only one bus or only one type of bus.

When the communication apparatus 1100 and the communication apparatus 1200 are specifically chips or chip systems, the communication module 1102 and the communication interface 1210 may output or receive baseband signals. When the communication apparatus 1100 and the communication apparatus 1200 are specifically devices, the communication module 1102 and the communication interface 1210 may output or receive radio frequency signals.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, any conventional processor, or the like. The steps of the method disclosed with reference to this embodiment of this application may be directly performed by a hardware processor, or may be performed by using a combination of hardware in the processor and a software module.

In this embodiment of this application, the memory 1230 may be a non-volatile memory, for example, a hard disk drive (hard disk drive, HDD) or a solid-state drive (solid-state drive, SSD), or may be a volatile memory (volatile memory), for example, a random-access memory (random-access memory, RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

Some or all of operations and functions performed by the source EES, the source EAS, the EEC, the target EES, or the target EAS described in the foregoing method embodiments of this application may be implemented by using a chip or an integrated circuit.

To implement the functions of the communication apparatus in FIG. 11 or FIG. 12, an embodiment of this application further provides a chip, including a processor, configured to support the communication apparatus in implementing the functions of the source EES, the source EAS, the EEC, the target EES, or the target EAS in the foregoing method embodiments. In a possible design, the chip is connected to a memory or the chip includes the memory, and the memory is configured to store program instructions and data that are necessary for the communication apparatus.

An embodiment of this application provides a computer-readable storage medium storing a computer program. The computer program includes instructions used to perform the foregoing method embodiments.

An embodiment of this application provides a computer program product including instructions. When the computer program product runs on a computer, the foregoing method embodiments are performed.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although some embodiments of this application have been described, a person skilled in the art can make changes and modifications to these embodiments once they learn the basic inventive concept. Therefore, the appended claims are intended to be construed as to cover the embodiments and all changes and modifications falling within the scope of this application.

Clearly, a person skilled in the art can make various modifications and variations to embodiments of this application without departing from the spirit and scope of embodiments of this application. In this way, this application is intended to cover these modifications and variations in embodiments of this application provided that they fall within the scope of protection defined by the following claims of this application and their equivalent technologies.

What is claimed is:

1. A service continuity event notification method, comprising:
   receiving, by a source edge enabler server (source EES) a subscription message from a first device, wherein the subscription message is used for requesting to subscribe to a service continuity event notification associated with a terminal device; and
   sending, by the source EES, a notification message to the first device in response to a condition for the service continuity event notification being satisfied, wherein the notification message provides information for an application context transfer event of the terminal device and includes an event category that is usable to indicate a category of an event that triggers the service continuity event notification;
   wherein the first device is an edge application server (EAS) or an edge enabler client (EEC), and wherein the sending the event category includes sending an indication of completion of the transfer of the application context of the terminal device.

2. The method according to claim 1, wherein the sending the notification message to the first device in response to the condition for the service continuity event notification being satisfied includes:
   sending, by the source EES, the notification message to the first device in response to determining, based on a changed data network access identifier (DNAI), that a first device moves outside the service area of a source edge application server (EAS), wherein a data network access identifier (DNAI) of the terminal device changes.

3. The method according to claim 1, wherein the sending the notification message to the first device in response to the condition for the service continuity event notification being satisfied includes: sending, by the source EES, the notification message to the first device in response to determining that transfer of the application context of the first device is complete.

4. The method according to claim 1, wherein the receiving the subscription message includes receiving a condition for the service continuity event notification.

5. The method according to claim 1, wherein the receiving the subscription message includes receiving the identifier of the terminal device.

6. The method according to claim 1, wherein the receiving the subscription message includes receiving an identifier of the application.

7. The method according to claim 1, wherein the sending the event category includes sending an indication that the terminal device is requesting to transfer the context.

8. A communication apparatus wherein the communication apparatus is a source edge enabler server (source EES), the communication apparatus comprising:
   a non-transitory memory storing instructions; and
   a processor connected to the memory, wherein the processor is configured to execute the instructions to cause the processor to:
      receive a subscription message from a first device, wherein the subscription message is used for requesting to subscribe to a service continuity event notification associated with a terminal device; and
      send a notification message to the first device in response to a condition for the service continuity event notification being satisfied, wherein the notification message provides information for an application context transfer event of the terminal device and includes an event category that is usable to indicate a category of an event that triggers the service continuity event notification;
   wherein the first device is an edge application server (EAS) or an edge enabler client (EEC), and wherein the sending the event category includes sending an indication of completion of the transfer of the application context of the terminal device.

* * * * *